(12) United States Patent
Mimura et al.

(10) Patent No.: US 6,390,629 B1
(45) Date of Patent: May 21, 2002

(54) TRIANGULAR-PYRAMIDAL CUBE-CORNER RETROREFLECTION SHEET

(75) Inventors: Ikuo Mimura, Uozu; Keiji Adachi, Sano, both of (JP)

(73) Assignee: Nippon Carbide Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/673,846

(22) PCT Filed: Apr. 21, 1999

(86) PCT No.: PCT/JP99/02118

§ 371 Date: Oct. 23, 2000

§ 102(e) Date: Oct. 23, 2000

(87) PCT Pub. No.: WO99/54760

PCT Pub. Date: Oct. 28, 1999

(30) Foreign Application Priority Data

Apr. 22, 1998 (JP) .......................................... 10-128295

(51) Int. Cl.[7] .............................................. G02B 5/124
(52) U.S. Cl. ........................................ 359/530; 359/529
(58) Field of Search ................................ 359/529, 530; 428/141, 156, 167

(56) References Cited

U.S. PATENT DOCUMENTS

| 2,310,790 A | 2/1943 | Jungersen | |
| 2,380,447 A | 7/1945 | Jungersen | |
| 2,481,757 A | 9/1949 | Jungersen | |
| 3,712,706 A | 1/1973 | Stamm | |
| 4,025,159 A | 5/1977 | McGrath | |
| RE29,396 E | 9/1977 | Heenan | 204/281 |
| 4,349,598 A | 9/1982 | White | 428/161 |
| 4,588,258 A | 5/1986 | Hoopman | |
| 4,897,136 A | 1/1990 | Bailey et al. | 156/145 |
| 5,064,272 A | 11/1991 | Bailey et al. | 359/541 |
| 5,138,488 A | 8/1992 | Szczech | 359/529 |
| 5,557,836 A | 9/1996 | Smith et al. | 29/527.4 |
| 5,564,870 A | 10/1996 | Benson et al. | 409/131 |
| 5,600,484 A | 2/1997 | Benson et al. | 359/529 |
| 5,721,640 A | 2/1998 | Smith et al. | 359/530 |
| 6,083,607 A | * 7/2000 | Mimura et al. | 428/167 |

FOREIGN PATENT DOCUMENTS

| EP | 0 137 736 | 4/1985 |
| EP | 0 175 031 | 3/1986 |
| EP | 0 548 280 | 6/1993 |
| GB | 441319 | 12/1933 |
| JP | 63-143502 | 6/1988 |
| WO | 92/04647 | 3/1992 |
| WO | WO 94/14091 | 6/1994 |
| WO | WO 95/11463 | 4/1995 |
| WO | WO 95/11465 | 4/1995 |
| WO | WO 95/11470 | 4/1995 |

* cited by examiner

*Primary Examiner*—James Phan
(74) *Attorney, Agent, or Firm*—Fitzpatrick, Cella, Harper & Scinto

(57) ABSTRACT

A triangular-pyramidal cube-corner retroreflective sheeting characterized in that a lateral face (prism face) (face c) using a base edge (x) of triangular-pyramidal reflective elements faced each other and arranged in the closest-packed state by sharing the base edge (x) on a base plane (X–X') as one side is hexagonal or triangular, two other faces (faces a and b) sharing one ridge line starting with an apex (H) of the triangular-pyramidal reflective elements is quadrangular and when assuming the height from the apex (H) up to the base plane (X–X') as (h) and the height up to a substantially horizontal plane (Z–Z') including base edges (z and w) of other two faces (faces a and b) as ($h_0$), and the angle formed between the optical axis of the triangular-pyramidal reflective elements and a plane (Y–Y') including the base edge (x) and vertical to the base plane (X–X') as ($\theta$), h and $h_0$ are not substantially equal to each other but $h/h_0$ and $\theta$ meet a specific relational expression.

15 Claims, 7 Drawing Sheets

TRIANGULAR-PYRAMIDAL CUBE-CORNER RETROREFLECTION SHEET

TECHNICAL FIELD

The present invention relates to a triangular-pyramidal cube-corner retroreflective sheeting having a novel structure. More minutely, the present invention relates to a triangular-pyramidal cube-corner retroreflective sheeting in which triangular-pyramidal reflective elements having a novel structure are arranged in the closest-packed state.

Still more minutely, the present invention relates to a cube-corner retroreflective sheeting constitute of triangular-pyramidal cube-corner retroreflective elements (hereafter referred to as triangular-pyramidal reflective elements or merely, elements) useful for signs including traffic signs and construction work signs, license plates of automobiles and motorcycles, safety materials of clothing and life preservers, markings of signboards, and reflectors of visible-light, laser-beam, and infrared-ray reflective sensors.

Still further minutely, the present invention relates to a triangular-pyramidal cube-corner retroreflective sheeting characterized in that triangular-pyramidal cube-corner retroreflective elements protruded beyond a common base plane (X–X') are faced each other and arranged on the base plane (X–X') in the closest-packed state by sharing one base edge on the base plane (X–X'), the base plane (X–X') is a common plane including many base edges (x, x, ...) shared by the triangular-pyramidal reflective elements, the two triangular-pyramidal reflective elements faced each other constitute an element pair having substantially same shape faced so as to be respectively substantially symmetric to planes (Y–Y', Y–Y', ...) vertical to the base plane (X–X') including many shared base edges (x, x, ...) on the base plane (X–X'), the triangular-pyramidal reflective elements are constituted of substantially same hexagonal or triangular lateral faces (prism faces) (faces $c_1$ and $c_2$) using the shared base edges (x, x, ...) as one sides and substantially same quadrangular lateral faces (faces $a_1$ and $b_1$ and faces $a_2$ and $b_2$) substantially orthogonal to the face $c_1$ or the face $c_2$ by using two upper sides of the face $c_1$ or $c_2$ starting with apexes ($H_1$ and $H_2$) of the triangular-pyramidal reflective elements as one sides and sharing one ridge line of the triangular-pyramidal reflective elements and using the ridge line as one side, and when assuming the height from the apexes ($H_1$ and $H_2$) of the triangular-pyramidal reflective elements up to the base plane (X–X') including the base edges (x, x, ...) of the hexagonal or triangular lateral faces (faces $c_1$ and $c_2$) of the triangular-pyramidal reflective elements as (h), the height from the apexes ($H_1$ and $H_2$) of the triangular-pyramidal reflective elements up to a substantially horizontal plane (Z–Z') including base edges (z and w) of other lateral faces (faces $a_1$ and $b_1$ and faces $a_2$ and $b_2$) of the triangular-pyramidal reflective elements as ($h_0$), the intersection between a vertical line from the apexes ($H_1$ and $H_2$) of the triangular-pyramidal reflective elements to the base plane (X–X') and the base plane (X–X') as P, the intersection between an optical axis passing through the apexes ($H_1$ and $H_2$) and the base plane (X–X') as Q, and moreover, expressing distances from the intersections (P) and (Q) up to planes (Y–Y', Y–Y', ...) including the base edges (x, x, ...) shared by the triangular-pyramidal reflective elements and vertical to the base plane (X–X') as p and q, and assuming the angle formed between the optical axis and the vertical plane (Y–Y') as (θ), the above h and $h_0$ are not substantially equal and meet the following expression (1).

$$0.5R \leq \frac{h}{h_0} \leq 1.5R \quad (1)$$

(In the above expression, R is defined by the following expression.)

$$R = \frac{\sin(35.2644° - \theta) + 1.2247 \sin\theta}{\sin(35.2644° - \theta)}$$

(In the above expression, it is assumed that when the value of the above (p–q) is negative, θ takes a negative (–) value.)

BACKGROUND ART

A retroreflective sheeting for reflecting incoming light toward a light source has been well known so far and the sheeting using its retroreflective characteristic is widely used in the above fields. Particularly, a retroreflective sheeting using the retroreflective principle (theory) of a cube-corner retroreflective element such as a triangular-pyramidal reflective element is extremely superior to a conventional retroreflective sheeting using micro glass beads in retroreflectivity and its purpose has been expanded year by year because of its superior retroreflective performance.

However, though a conventionally-publicly-known triangular-pyramidal retroreflective element shows a preferable retroreflectivity when the angle formed between the optical axis of the element {axis passing through the apex of the triangular pyramid of the triangular-pyramidal retroreflective element equally separate from three lateral faces (faces a, b, and c)} constituting a triangular-pyramidal cube-corner retroreflective element and intersecting each other at an angle of 90° and an incident light (the angle is hereafter referred to as entrance angle) is kept in a small range, the retro-reflectivity rapidly deteriorates as the entrance angle increases (that is, the entrance angularity deteriorates).

Moreover, the reflection principle (theory) of a triangular-pyramidal retroreflective element uses internal total reflection caused on the interface between air and a transparent medium constituting the triangular-pyramidal reflective element when light is emitted to air from the transparent medium at a specific angle {critical angle ($\alpha_c$)} or more. The critical angle ($\alpha_c$) is shown as the following expression by a refractive index (n) of a transparent medium constituting a triangular-pyramidal reflective element and a refractive index ($n_0$) of air.

$$\sin \alpha_c = \frac{n_0}{n}$$

In this case, it is allowed to consider the refractive index ($n_0$) of air is almost equal to 1 and constant. Therefore, the critical angle ($\alpha_c$) decreases as the value of the refractive index (n) of the transparent medium increases and light easily reflects from the interface between the transparent medium and air. When using a synthetic resin for a transparent medium, the critical angle ($\alpha_c$) shows a comparatively large value of approx. 42° because most synthetic resins have a refractive index of approx. 1.5.

Light incoming to the surface of a retroreflective sheeting using the above triangular-pyramidal reflective element at a large entrance angle reaches the interface between the triangular-pyramidal reflective element and air at a comparatively small angle from a lateral face (reflecting surface) of the reflective element after passing through the triangular-pyramidal reflective element. When the comparatively small angle is smaller than the critical angle ($\alpha_c$), the light passes through the back of the element without totally reflecting from the interface. Therefore, a retroreflective sheeting using a triangular-pyramidal reflective element has a disadvantage that it is generally inferior in entrance angularity.

However, because a triangular-pyramidal retroreflective element is able to reflect light in the light incoming direction over almost entire surface of the element, reflected light does not reflect by emanating to a wide angle due to spherical aberration like a micro-glass-bead reflective element. However, in practical use, the narrow divergence angle of retroreflected light easily causes a trouble that the light emitted from a head lamp of an automobile does not easily reach eyes of a driver present at a position separate from the optical axis of the light such as eyes of the driver when the light is retroreflected from a traffic sign. The above trouble more frequently occurs particularly when an automobile approaches a traffic sign because the angle (observation angle) formed between a light entrance axis and an axis connecting a driver and a reflection point (that is, the observation angularity deteriorates).

Many proposals have been made so far for the above cube-corner retroreflective sheeting, particularly for a triangular-pyramidal cube-corner retroreflective sheeting and various improvements and studies are made.

For example, Jungersen's U.S. Pat. No. 2,481,757 discloses a retroreflective sheeting constituted by arranging retroreflective elements of various shapes on a thin sheeting and a method for manufacturing the sheeting. Triangular-pyramidal reflective elements disclosed in the above U.S. patent include a triangular-pyramidal reflective element in which the apex is located at the center of a base-plane triangle and the optical axis does not tilt and a triangular-pyramidal reflective element in which the apex is not located at the center of a base-plane triangle but the optical axis tilts. More-over, it is described in the U.S. patent to efficiently reflect light toward an approaching automobile. Furthermore, it is described that the size of a triangular-pyramidal reflective element, that is, the depth of the element is $\frac{1}{10}$" in (2,540 $\mu$m) or less. Furthermore, FIG. 15 in the U.S. patent illustrates a triangular-pyramidal reflective element whose optical axis tilts in the plus (+) direction similarly to the case of a preferred mode of the present invention. The tilt angle ($\theta$) of the optical axis is estimated as approx. 6.5° when obtaining it from the ratio between the longer edge and shorter edge of the base-triangular plane of the illustrated triangular-pyramidal reflective element.

However, the above Jungersen's U.S. patent does not specifically disclose a very small triangular-pyramidal reflective element shown in the present invention or it does not disclose a size or an optical-axis tilt which a triangular-pyramidal reflective element must have in order to show superior observation angularity and entrance angularity.

Moreover, Stamm's U.S. Pat. No. 3,712,706 discloses a retroreflective sheeting in which the so-called equilateral triangular-pyramidal cube-corner retroreflective elements in which shapes of their base-plane triangles are equilateral triangular and shapes of three other sides are right isosceles triangular are arranged on a thin sheeting so that their base planes are brought into the closest-packed state on a common plane. Stamm's U.S. patent solves the problem that retroreflectivity is deteriorated due to increase of an entrance angle through mirror reflection by vacuum-coating the reflective surface of a reflective element with a metal such as aluminum and the above trouble that the light incoming at an angle of less than an internal total-reflection condition passes through the interface between elements and thereby, it does not retroreflect.

However, because the above Stamm's proposal uses the mirror reflection principle (theory) as means for improving the angularity (wide angularity), the proposal easily causes the trouble that the appearance of an obtained retroreflective sheeting becomes dark or the reflective brightness easily deteriorates because a metal such as aluminum or silver used for the mirror surface is oxidized due to incoming water or air while it is used. Moreover, the proposal does not describe means for improving the angularity (wide angularity) by a tilt of an optical axis at all.

Moreover, Hoopman's European Pat No. 137,736(B) discloses a retroreflective sheeting in which triangular-pyramidal cube-corner retroreflective elements with a tilted optical axis whose triangular base-plane is isosceles triangular are brought into the closest-packed state on a common plane. Moreover, it is described that the optical axis of a triangular-pyramidal cube-corner retroreflective element disclosed in the patent tilts in a negative (–) direction and its tilt angle approximately ranges between 7° and 13°.

However, according to the relation between reflective brightness and optical-axis tilt examined by the present inventor et al. through the light tracing method, it is found that reflective brightness lowers as the tilt angle of a optical axis exceeds 4° and further increases in a negative direction and particularly, the reflective brightness of a triangular-pyramidal reflective element whose optical axis exceeds 6° in a negative direction extremely lowers. This may be because areas of three prism faces a, b, and c forming a triangular-pyramidal reflective element whose optical axis does not tilt are equal to each other but areas of faces a and b of an element whose optical axis tilts in a negative direction slowly decrease compared to the area of the face c of the element as the tilt angle of the element increases.

Moreover, Szczech's U.S. Pat. No. 5,138,488 also discloses a retroreflective sheeting in which titled triangular-pyramidal cube-corner retroreflective elements whose base planes are isosceles triangular are arranged on a thin sheeting so that the base planes are brought into the closest-packed state. In the U.S. patent, optical axes of the triangular-pyramidal reflective elements tilt in the direction of a side shared by paired triangular-pyramidal reflective elements faced each other and it is specified that the tilt angle approximately ranges between 2° and 5° and the size of an element ranges between 25 and 100 $\mu$m.

Furthermore, European Pat. No. 548,280(B1) corresponding to the above U.S. patent discloses that the distance between a plane including a common side of paired triangular-pyramidal cube-corner retroreflective elements and vertical to a common plane and the apex of the element is not equal to the distance between the intersection with the common plane of the optical axis of the element and the vertical plane, that is, the tilt of the optical axis may be either of positive (+) and negative (–) directions, and its tilt angle approximately ranges between 2° and 5°, and the size of the element ranges between 25 and 100 $\mu$m.

As described above, in the case of Szczech's European Pat. No. 548,280(B1), the tilt of an optical axis approximately ranges between 2° and 5° including positive (+) and negative (–) directions. However, in the case of the tilt of the optical axis in the range of the Szczech's invention, wide angularity, particularly entrance angularity is not adequately improved.

The conventionally-publicly-known triangular-pyramidal cube-corner retroreflective elements of Jungersen's U.S. Pat.

No. 2,481,757, Stamm's U.S. Pat. No. 3,712,706, Hoopman's European Pat. No. 137,736(B1), Szczech's U.S. Pat. No. 5,138488 and European Pat. No. 548,280(B1) are common to each other in that base planes of many triangular-pyramidal reflective elements serving as a core of entrance and reflection of light are present on the same plane. Thus, every retroreflective sheeting constituted of triangular-pyramidal reflective elements whose base planes are present on the same plane is inferior in entrance angularity, that is, it has a disadvantage that retroreflective brightness suddenly deteriorates when an entrance angle of light to the triangular-pyramidal reflective element increases.

DISCLOSURE OF THE INVENTION

In general, not only high brightness, that is, level (magnitude) of reflective brightness of the light incoming from the front of a triangular-pyramidal cube-corner retroreflective sheeting but also wide angularity of the light are requested as basic optical characteristics of the sheeting and moreover, three performances such as observation angularity, entrance angularity, and rotational angularity are requested for the wide angularity.

As described above, every conventionally-publicly-known retroreflective sheeting constituted of triangular-pyramidal cube-corner retroreflective elements has been inferior in entrance angularity and observation angularity. However, the present inventor et al. found through light-tracing simulation that it is possible to improve the entrance angularity of a retroreflective sheeting constituted of triangular-pyramidal reflective elements by making the height (h') from the plane (X–X') including many base edges (x, x, . . . ) shared by the triangular-pyramidal reflective elements set at symmetric positions each other up to the apexes ($H_1$ and $H_2$) of the elements substantially larger than the height (h) from the plane (Z–Z') including base edges (z and w) of two faces (faces a and b) substantially orthogonal to the face c having one base edge shared by the triangular-pyramidal reflective elements as one side up to the apex of the reflective elements and applied a patent. (Japanese Patent Application No. 295907/1996).

Moreover, the present inventor et al. continued the study by light tracing simulation and found that it is also possible to improve the entrance angularity of a retroreflective sheeting constituted of two triangular-pyramidal reflective elements faced each other by making the height (h') from the first plane (X–X') including base edges (x, x, . . . ) of lateral faces (faces $c_1$ and $c_2$) having base edges (x, x, . . . ) shared by the triangular-pyramidal reflective elements as one side up to the apexes ($H_1$ and $H_2$) of the triangular-pyramidal reflective elements substantially smaller than the height (h) from the substantially-horizontal second base plane (Z–Z') including the base edges (z and w) of other lateral faces (faces $a_1$ and $b_1$ and faces $a_2$ and $b_2$) of the triangular-pyramidal reflective elements up to the apexes ($H_1$ and $H_2$) of the triangular-pyramidal reflective elements and applied a patent.

(Japanese Patent Application No. 330836/1997)

The present inventor et al. further continued the study that the improvement in the above two applied patents was achieved by minimizing the problem of relatively enlarging or contracting sizes of the lateral faces (faces $c_1$ and $c_2$) which had been conventionally caused by a tilt of an optical axis compared to other lateral faces (faces $a_1$ and $b_1$ and faces $a_2$ and $b_2$). As a result, we found that the ratio between the height (h) from the base plane (X–X') including common base edges (x, x . . . ) of the lateral faces $c_1$ and $c_2$ faced with the triangular-pyramidal reflective element pair up to the apexes ($H_1$ and $H_2$) of the element pair and the height ($h_0$) from one horizontal plane (Z–Z') including the base edges (z and w) of the two substantially-same-shaped lateral faces (faces $a_1$ and $b_1$ and faces $a_2$ and $b_2$) of the element pair up to the apexes ($H_1$ and $H_2$) of the element pair must be kept in a specific range shown by a tilt angle θ of an optical axis and a specific relational expression and finished the present invention.

Therefore, the present invention relates to a triangular-pyramidal cube-corner retroreflective sheeting characterized in that triangular-pyramidal cube-corner retroreflective elements protruded beyond a common base plane (X–X') are faced each other and arranged in the closest-packed state by sharing one base edge on the base plane (X–X'), the base plane (X–X') is a common plane including many base edges (x, x, . . . ) shared by the triangular-pyramidal reflective elements, the two triangular-pyramidal reflective elements faced each other constitute an element pair having substantially same shape faced so as to be respectively substantially symmetric to planes (Y–Y', Y–Y', . . . ) vertical to the base plane (X–X') including many shared base edges (x, x, . . . ) on the base plane (X–X'), the triangular-pyramidal reflective elements are constituted of substantially same hexagonal or triangular lateral faces (faces $c_1$ and $c_2$) using the shared base edges (x, x, . . . ) as one sides and substantially same quadrangular lateral faces (faces $a_1$ and $b_2$ and faces $a_2$ and $b_2$) substantially orthogonal to the face $c_1$ or the face $c_2$ by using upper two sides of the face $c_1$ or face $c_2$ starting with apexes ($H_1$ and $H_2$) of the triangular-pyramidal reflective elements as one sides and sharing one ridge line of the triangular-pyramidal reflective elements and using the ridge line as one side, and when assuming the height from the apexes ($H_1$ and $H_2$) of the triangular-pyramidal reflective elements up to the base plane (X–X') including the base edges (x, x, . . . ) of the hexagonal or triangular lateral faces (face $c_1$ and face $c_2$) of the triangular-pyramidal reflective elements as (h), the height from the apexes ($H_1$ and $H_2$) of the triangular-pyramidal reflective elements up to a substantially horizontal plane (Z–Z') including base edges (z and w) of other lateral faces (faces $a_1$ and $b_2$ and faces $a_2$ and $b_2$) of the triangular-pyramidal reflective elements as ($h_0$), the intersection between a vertical line from the apexes ($H_1$ and $H_2$) of the triangular-pyramidal reflective elements to the base plane (X–X') and the base plane (X–X') as P, the intersection between an optical axis passing through the apexes ($H_1$ and $H_2$) and the base plane X–X') as Q, and moreover, expressing distances from the intersections (P) and (Q) up to planes (Y–Y', Y–Y', . . . ) including the base edges (x, x, . . . ) shared by the triangular-pyramidal reflective elements and vertical to the base plane (X–X') as p and q, and assuming the angle formed between the optical axis and the vertical plane (Y–Y') as (θ), the above h and $h_0$ are not substantially equal and meet the following expression (1).

$$0.5R \leq \frac{h}{h_0} \leq 1.5R \qquad (1)$$

(In the above expression, R is defined by the following expression.)

$$R = \frac{\sin(35.2644° - \theta) + 1.2247\sin\theta}{\sin(35.2644° - \theta)}$$

(In the above expression, it is assumed that when the value of the above (p–q) is negative, θ takes a negative (–) value.)

The present invention is more minutely described below by properly referring to the accompanying drawings.

DETAILED DESCRIPTION OF THE INVENTION

Before explaining the present invention, a conventionally-publicly-known art is first described below.

FIGS. 1 to 4 show top vies and sectional views for explaining a triangular-pyramidal cube-corner retroreflective element according to the prior art for comparison with a triangular-pyramidal cube-corner retroreflective element of the present invention.

Figure 1:
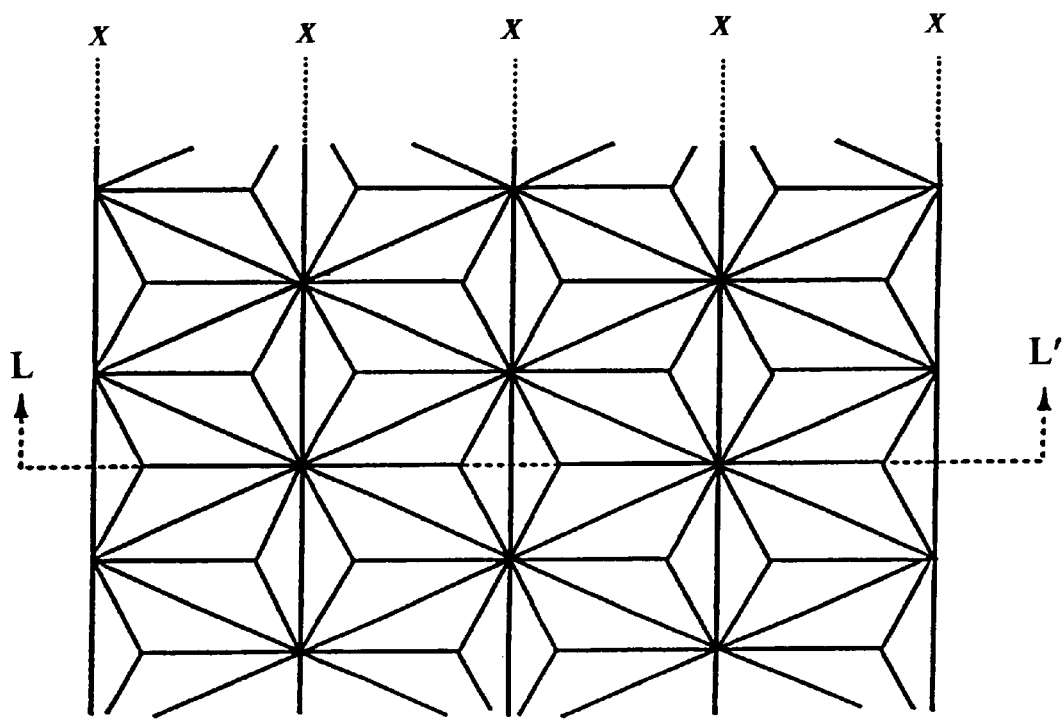
FIG. 1 is a top view of a positively-tilted triangular-pyramidal cube-corner retroreflective element group according to the prior art.
Figure 3:
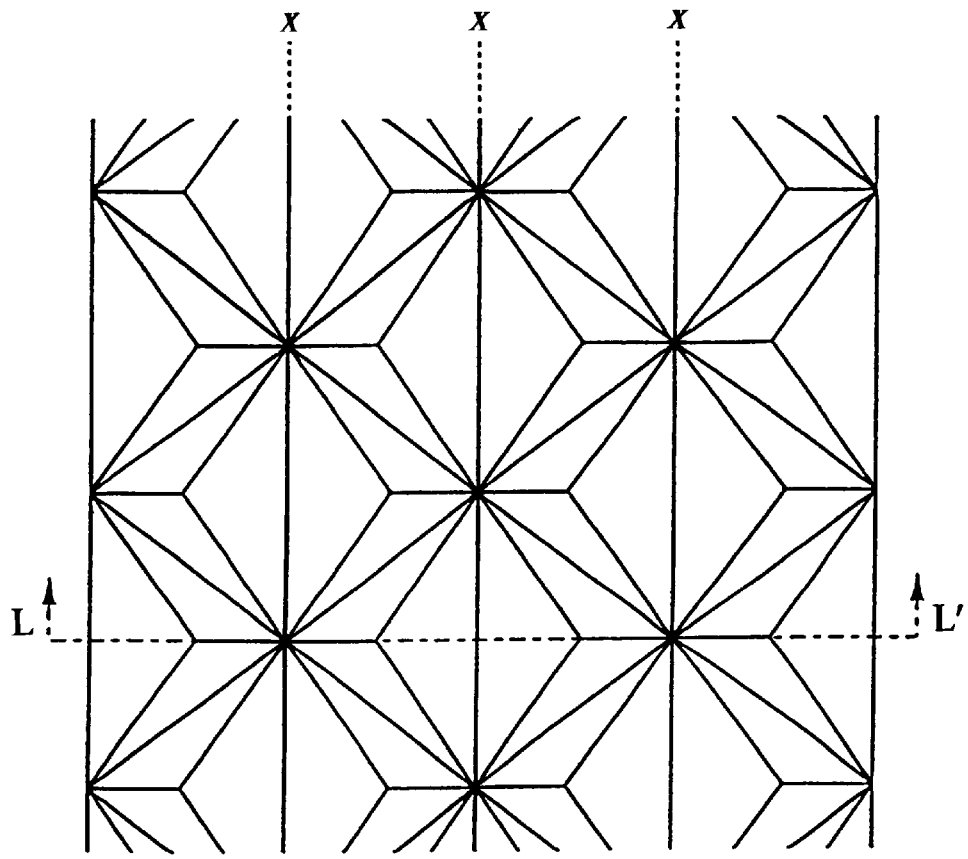
FIG. 3 is a top view of a negatively-tilted triangular-pyramidal cube-corner retroreflective element group according to the prior art.

In FIGS. 1 and 3, base edges of triangular-pyramidal cube-corner retroreflective elements protruded beyond a common plane are arranged on a common plane (X–X') in the closest-packed state as a pair of triangular-pyramidal reflective elements sharing one base edge (x, x, . . . ) and faced each other so as to be substantially symmetric to a plane (Y–Y') vertical to a base plane (X–X') including the shared base edge (x, x, . . . ).

Figure 2:
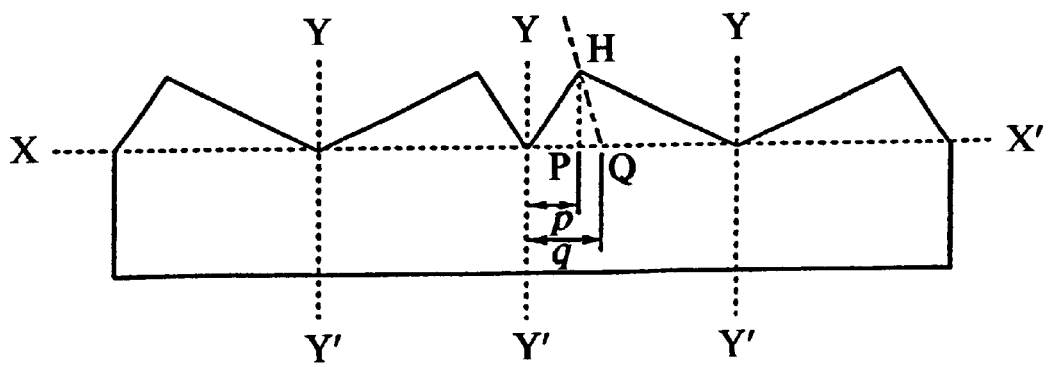
FIG. 2 is a sectional view of the positively-tilted triangular-pyramidal cube-corner retroreflective element group shown in FIG. 1 according to the prior art, when cut by the sectional line (L–L')
Figure 4:
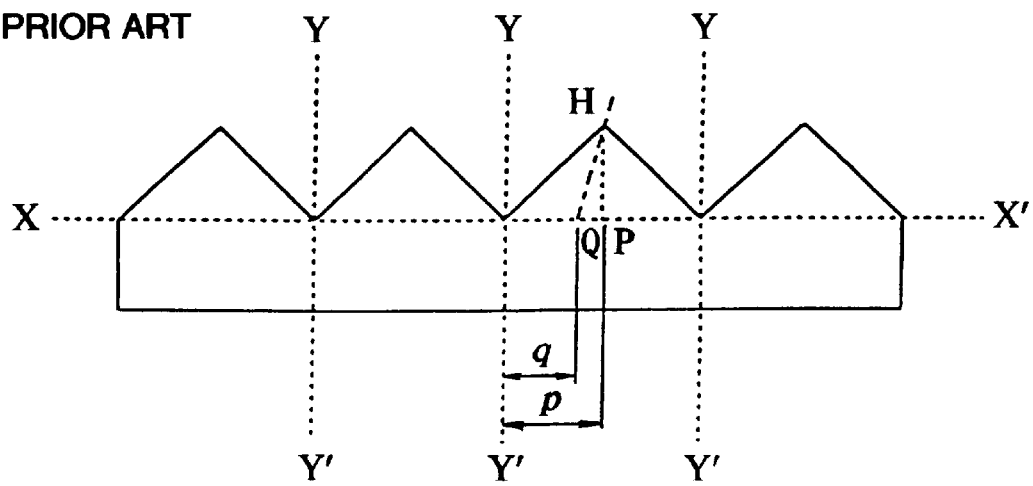
FIG. 4 is a sectional view of the negatively-tilted triangular-pyramidal cube-corner retroreflective element group shown in FIG. 2 according to the prior art, when cut by the sectional line (L–L')
Figure 5:
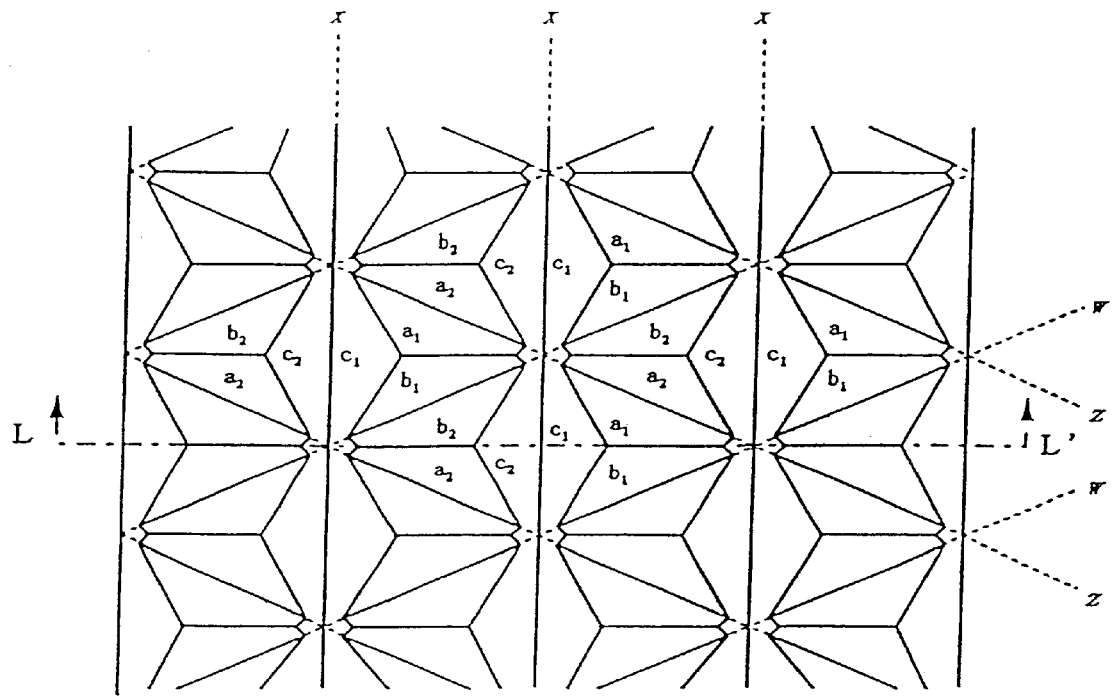
FIG. 5 is a top view of a positively-tilted triangular-pyramidal cube-corner retroreflective element group for explaining the present invention.
Figure 6:
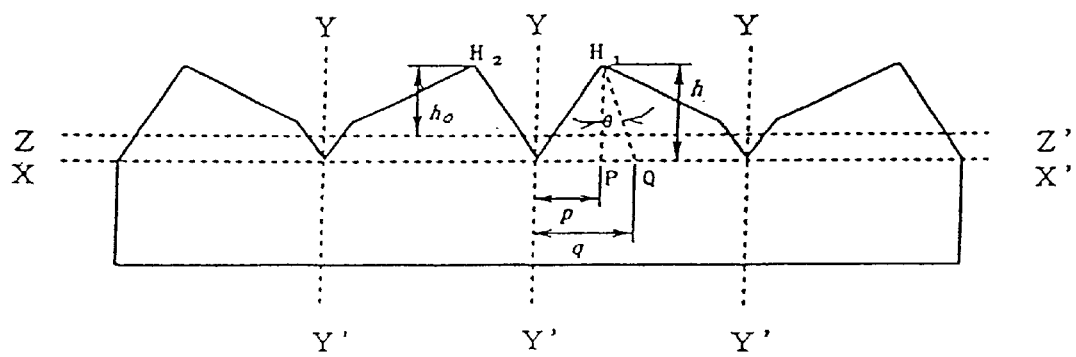
FIG. 6 is a sectional view of the positively-tilted triangular-pyramidal corner retroreflective element group shown in FIG. 5 for explaining the present invention, when cut by the sectional line (L–L') in FIG. 5.

Moreover, FIGS. 2 and 4 show sectional views of the triangular-pyramidal reflective elements cut by sectional lines (L–L') of the element groups shown in FIGS. 1 and 3. The element pairs of a tilted triangular-pyramidal cube-corner retroreflective sheeting have optical axes oriented in the opposite direction to each other. When assuming the distance from the intersection (P) between a vertical line extended from the apex (H) of the element to the base plane (X–X') and the base plane (X–X') up to the base edges (x, x, . . . ) shared by the element pair as (p) and the distance from the intersection (Q) between an optical axis and the base plane up to the base edges (x, x, . . . ) shared by the element pair as (q), the optical axis tilts from the vertical plane (Y–Y') in a direction in which the difference (q–p) becomes positive (+) in FIG. 2 and negative (–) in FIG. 4. FIG. 5 and 6 show a top view and a sectional view for explaining triangular-pyramidal cube-corner retroreflective elements of the present invention.

In FIG. 5, it is shown that positively-tilted triangular-pyramidal cube-corner retroreflective elements having three lateral faces substantially orthogonal to each other and protruded beyond a common base plane (X–X') are faced each other and arranged on a substrate in the closest-packed state by sharing one base edge (x, x, . . . ) on the base plane (X–X').

FIG. 6 shows a sectional view of a positively-tilted triangular-pyramidal reflective element of the present invention when cut by the sectional line (L–L') of the element group shown in FIG. 5. As shown in FIG. 5, the positively-tilted triangular-pyramidal reflective element of the present invention is constituted of hexagonal lateral faces (faces $c_1$ and $c_2$) faced each other by shaking one base edge (x) on the base plane (X–X') and substantially-same-shaped quadrangular lateral faces (faces $a_1$ and $b_2$ and faces $a_2$ and $b_2$) substantially orthogonal to the face $c_1$ or $c_2$ using upper two sides of the face $c_1$ or $c_2$ starting with apexes ($H_1$ and $H_2$) of the triangular-pyramidal reflective elements as one sides, sharing one ridge line of the triangular-pyramidal reflective element, and using the ridge line as one side.

As shown in FIG. 5, positively-tilted triangular-pyramidal reflective elements each of which is one of modes of the present invention are arranged on a substrate in the closest-packed state at a repetitive pattern by sharing a base edge (x) on the base plane (X–X') and forming a substantially-same-shaped element pair faced each other so as to be substantially symmetric. Therefore, the common base edge (x) constitutes a continuous straight line. Moreover, many base edges (x) shared by other adjacent triangular-pyramidal reflective element groups are parallel with a straight line constituting the base edges (x) and form parallel straight-line groups having equal repetitive pitches.

Therefore, the lateral faces ($c_1$ and $c_2$ faces) of the positively-tilted triangular-pyramidal reflective element of the present invention are faced each other by sharing a base edge (x) and the base edge (x) constitutes a continuous straight line. Therefore, the face $c_1$ forms a continuous plane and the face $c_2$ also forms a continuous plane. Moreover, the quadrangular lateral faces (small quadran-gular lateral faces surrounded by faces $a_1$ and $b_2$ and two $c_2$ faces) are also located on a plane on the line x formed by the face $c_1$ or $c_2$. As a result, the base edge of the plane formed by the face $c_1$ or $c_2$ and the lateral face having the small quadrangle is present on the above continuous straight line and has a lateral face same as the face c whose cross section forms a V-shaped groove.

The term "substantial" in this description is an expression including even a very slight difference. For example, "substantially symmetric" and "substantially same shape" are expressions including a case in which corresponding side and/or angle is or are completely the same and the magnitude of the side or angle is very slightly different.

Figure 7:
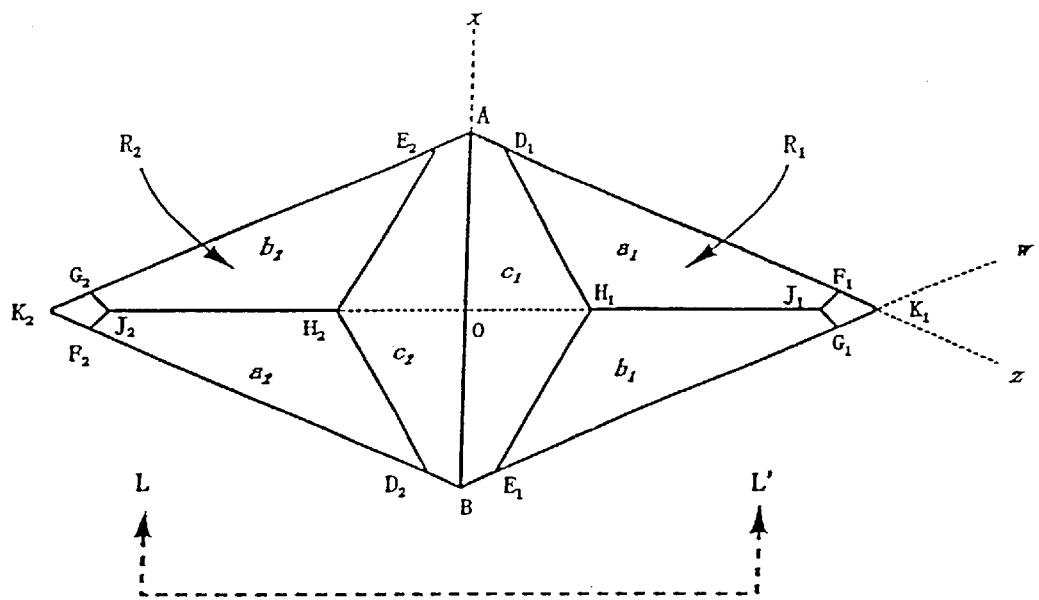
FIG. 7 is an enlarged top view of a pair of positively-tilted triangular-pyramidal reflective elements for explaining the present invention.
Figure 8:
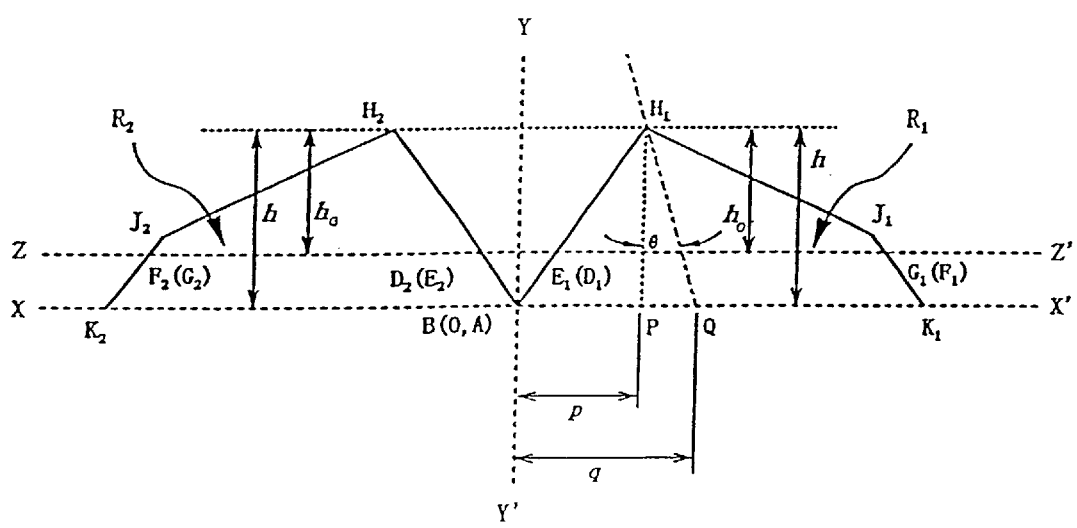
FIG. 8 is a side view of the positively-tilted triangular-pyramidal reflective element pair shown in FIG. 7 for explaining the present invention, when viewed from the line (L–L' in FIG. 7.

To easily understand the present invention, an enlarged top view of a pair of positively-tilted triangular-pyramidal reflective elements shown as the following patterns in FIG. 5 is shown in FIG. 7 and a side view from the arrow shown by the line L–L' in FIG. 7 is shown in FIG. 8.

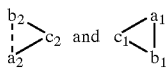

In FIGS. 7 and 8, the face $c_1$ of the right element $R_1$ (that is, the element shown by the following pattern in FIG. 5) of a pair of positively-tilted triangular-pyramidal reflective element of the present invention is a hexagonal plane surrounded by points $H_1$-$D_1$-A-B-$E_1$, the face $a_1$ is a quadrangular plane surrounded by points $H_1$-$J_1$-$G_1$-$E_1$, the faces $a_1$ and $b_2$ have substantially the same shape, and the faces $c_1$, $a_1$, and $b_2$ are substantially orthogonal to each other.

Moreover, the base plane of the right triangular-pyramidal reflective element $R_1$ shown by a plane A-B-$K_1$ forms a part of a common base plane (X–X').

In FIGS. 7 and 8, the left triangular-pyramidal reflective element shown by $R_2$ corresponds to the left triangular-pyramidal reflective element of the above pair of elements shown as the following pattern in FIG. 5 and the left triangular-pyramidal reflective element $R_2$ whose base plane is shown by A-B-$K_2$ has the same shape as the right reflective element $R_1$ whose base plane is shown by A-B-$K_1$ and the both elements are located at the both sides of the base edge (A-B) (present on the common bas edge x in FIG. 5) shared by the both elements, and the left element $R_2$ has a shape obtained by rotating the right element $R_1$ by 180° counterclockwise on the base plane (X–X') about the middle point (O) of the base edge (A-B) shared by the both elements.

Therefore, in FIG. 7, the face $c_2$ shown by the points $H_2$-$D_2$-B-A-$E_2$ of the left element $R_2$ and the face $a_2$ shown by the points $H_2$-$J_2$-$F_2$-$D_2$, and the face $b_2$ shown by the points $H_2$-$J_2$-$G_2$-$E_2$ have the same shape as the faces $c_1$, $a_1$, and $b_1$ of the right element $R_1$ and the faces $c_2$, $a_2$, and $b_2$ are substantially orthogonal (90°) to each other.

Therefore, in FIG. 8 which is a side view from the line L–L' direction in FIG. 7, the side view of the right element $R_1$ shown by the points B-$H_1$-$J_1$-$K_1$ and the side view of the left element $R_2$ shown by the points B-$H_2$-$J_2$-$K_2$ are substantially symmetric to right and left and have the same shape.

As shown in FIG. 8, apexes of positively-tilted triangular-pyramidal reflective elements ($R_1$ and $R_2$) are shown by $H_1$ and $H_2$ and the height from the base plane (X–X') including the base edge x common to the apexes ($H_1$ and $H_2$) is shown by h.

As shown in FIGS. 7 and 8, the height h corresponds to the depth from a plane (virtual plane) including the apexes $H_1$ and $H_2$ of the positively-tilted triangular-pyramidal reflective elements $R_1$ and $R_2$ of the present invention in the V-shaped valley formed by the faced faces $c_1$ and $c_2$ of the elements $R_1$ and $R_2$.

Moreover, as clearly shown in FIGS. 7 and 8, quadrangular lateral faces $a_1$ and $b_1$ and quadrangular lateral faces $a_2$ and $b_2$ of the positively-tilted triangular-pyramidal reflective elements $R_1$ and $R_2$ of the present invention have substantially the same shape, base edges $F_1$–$D_1$ and $G_1$–$E_1$ of the lateral faces $a_1$ and $b_1$ of the element $R_1$ and base edges $F_2$–$D_2$ and $G_2$–$E_2$ of the lateral faces as and $b_2$ of the element $R_2$ are present on the same horizontal plane (Z–Z'), and the height from the horizontal plane Z–Z' up to a plane (virtual plane) including apexes $H_1$ and $H_2$ of the elements $R_1$ and $R_2$ is shown by $h_0$ in FIG. 8.

Therefore, the depth of a valley formed between the lateral faces $a_1$ and $b_2$ and lateral faces $a_2$ and $b_2$ of the positively-tilted triangular-pyramidal reflective elements $R_1$ and $R_2$ of the present invention and corresponding lateral faces of adjacent other elements from a plane including the apexes $H_1$ and $H_2$ (the bottom of the valley corresponds to base edges of the lateral faces $a_1$ and $b_2$ and lateral faces $a_2$ and $b_2$) is shown by $h_0$.

In the case of a positively-tilted triangular-pyramidal reflective element of the present invention, base edges of the faces $a_1$ and $a_2$ of the elements $R_1$ and $R_2$ are located on a common line z, base edges of the faces $b_2$ and $b_2$ are located on a line w, and base edges of the faces $c_1$ and $c_2$ are located on a common line x as shown in FIGS. 5 and 7.

Moreover, as shown in FIGS. 5 to 8 and previously described, a plurality of positively-tilted triangular-pyramidal reflective elements of the present invention share the base edge (x, x, . . . ) shared by two c faces to which the elements correspond and they are faced each other and arranged on a substrate in the closest-packed state.

A positively-tilted triangular-pyramidal cube-corner retroreflective sheeting of the present invention is described below by referring to FIGS. 5 to 8. That is, triangular-pyramidal cube-corner retroreflective elements protruded beyond a common base plane (X–X') are faced each other and arranged in the closest-packed state by sharing one base edge on the base plane (X–X'), the base plane (X–X') is a common plane including many base edges (x, x . . . ) shared by the triangular-pyramidal reflective elements, the two triangular-pyramidal reflective elements faced each other constitute an element pair having substantially same shape faced so as to be respectively substantially symmetric to planes (Y–Y', Y–Y', . . . ) vertical to the base plane (X–X') including many shared base edges (x, x . . . ) on the base plane (X–X'), the triangular-pyramidal reflective elements are constituted of substantially same hexagonal lateral faces (faces $c_1$ and $c_2$) using the shared base edges (x, x, . . . ) as one sides and substantially same quadrangular lateral faces (faces $a_1$ and $b_2$ and faces $a_2$ and $b_2$) substantially orthogonal to the face $c_1$ or the face $c_2$ by using upper two sides of the face $c_1$ or $c_2$ starting with apexes ($H_1$ and $H_2$) of the triangular-pyramidal reflective elements as one sides and sharing one ridge line of the triangular-pyramidal reflective elements and using the ridge line as one side, and when assuming the height from the apexes ($H_1$ and $H_2$) of the triangular-pyramidal reflective elements up to the base plane (X–X') including the base edges (x, x, . . . ) of the hexagonal lateral faces (faces $c_1$ and $c_2$) of the triangular-pyramidal reflective elements as (h), the height from the apexes ($H_1$ and $H_2$) of the triangular-pyramidal reflective elements up to a substantially horizontal plane (Z–Z') including base edges (z and w) of other lateral faces (faces $a_1$ and $b_1$ and faces $a_2$ and $b_2$) of the triangular-pyramidal reflective elements as ($h_0$), the intersection between a vertical line from the apexes ($H_1$ and $H_2$) of the triangular-pyramidal reflective elements to the base plane X–X') and the base plane (X–X') as P, the intersection between an optical axis passing through the apexes ($H_1$ and $H_2$) and the base plane (X–X') as Q, and moreover, expressing distances from the intersections (P) and (Q) up to planes (Y–Y', Y–Y', . . . ) including the base edges (x, x, . . . ) shared by the triangular-pyramidal reflective elements and vertical to the base plane (X–X') as p and q, the optical axis tilts in a direction in which (q–p) becomes positive (+) and the above h and $h_0$ are not substantially equal to each other.

Figure 9:
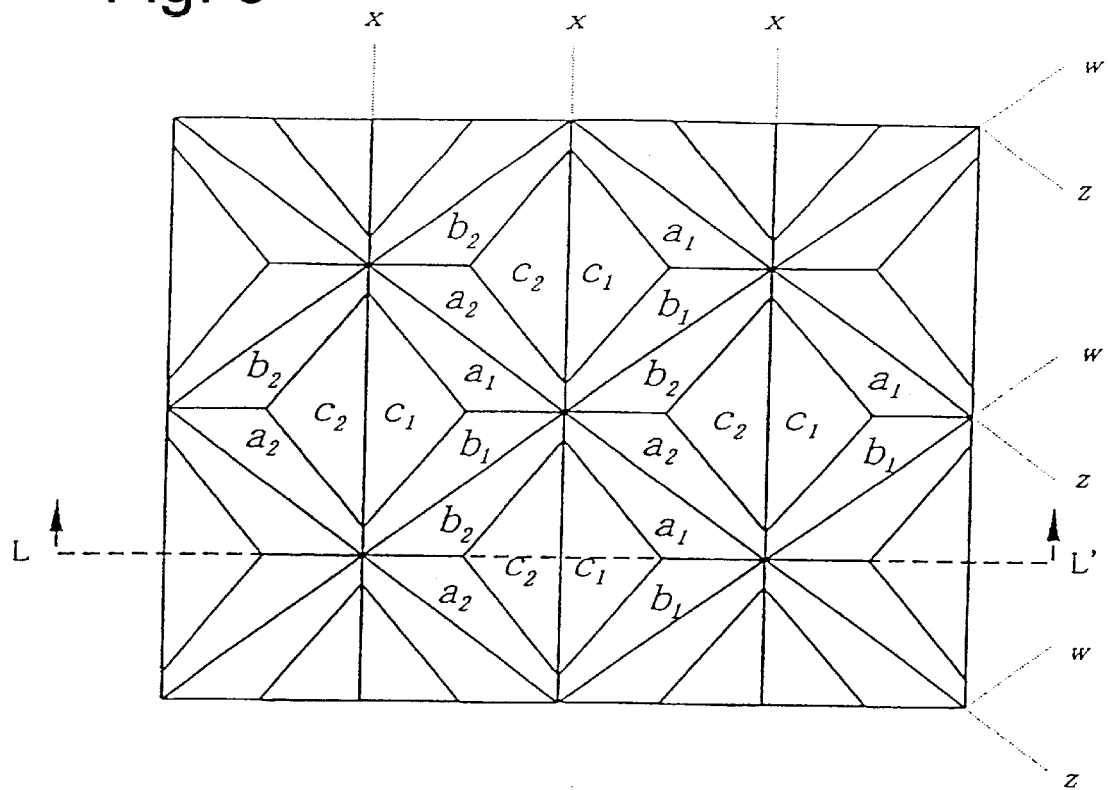
FIG. 9 is a top view of a negatively-tilted triangular-pyramidal cube-corner retroreflective element group shown in FIG. 9 for explaining the invention.
Figure 10:
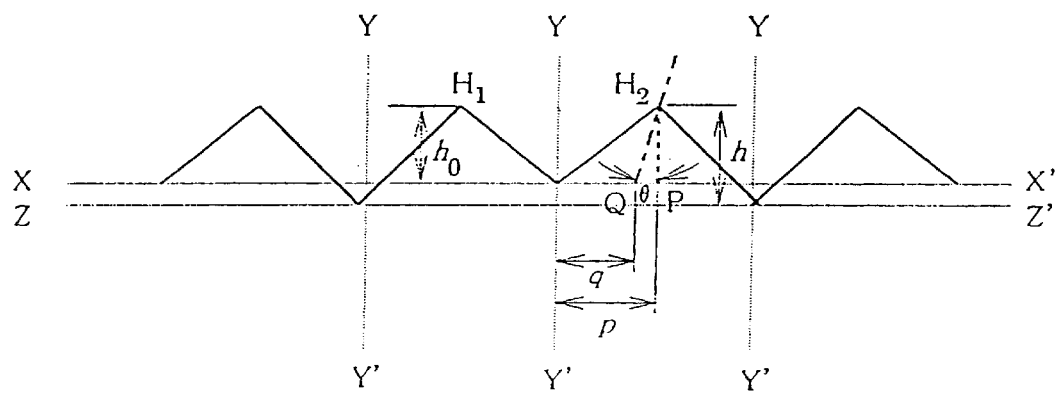
FIG. 10 is a sectional view of the negatively-tilted triangular-pyramid cube-corner retroreflective element group shown in FIG. 9 for explaining present invention, when cut by the sectional line (L–L') in FIG. 9.

FIGS. 9 and 10 show a top view and a sectional view for explaining negatively-tilted triangular-pyramidal cube-corner retro-reflective elements of the present invention. FIG. 9 shows that triangular-pyramidal cube-corner retroreflective elements protruded beyond a common base plane (X–X') share a base edge (x) on the base plane, and they are faced each other and arranged on the base plane in the closest-packed state.

Moreover, FIG. 10 shows a sectional view of negatively-tilted triangular-pyramidal reflective elements of the present invention cut by the sectional line (L–L') of the element group shown in FIG. 9. As shown in FIG. 9, the negatively-tilted triangular-pyramidal reflective elements of the present invention are constituted of substantially-same triangular lateral faces (faces $c_1$ and $c_2$) using the shared base edge (x, x, . . . ) as one side and two substantially-same quadrangular lateral faces (faces $c_1$ and $b_1$ and faces $a_2$ and $b_2$) substantially orthogonal to the lateral faces (faces $c_1$ and $c_2$) using two upper sides of the lateral faces (faces $c_1$ and $c_2$) starting with apexes ($H_1$ and $H_2$) of the triangular-pyramidal reflective elements as one sides, sharing one ridge line of the triangular-pyramidal reflective elements, and using the ridge line as one side.

As shown in FIG. 9, the negatively-tilted triangular-pyramidal reflective elements of the present invention shares a base edge (x, x, . . . ) on a base plane (X–X') and they are faced each other to form the substantially-same element pair faced so as to be substantially symmetric and arranged in the closest-packed state at a repetitive pattern. However, because the base plane (X–X') is located at a position substantially upper than a horizontal plane (Z–Z') serving as a common plane, the shared base edges (x, x, . . . ) do not constitute a continuous straight line through they are present on one straight light but they form a broken line broken every certain interval. Moreover, many base edges (x, x, . . . ) shared by a group of adjacent other triangular-pyramidal reflective element pairs are parallel with the broken straight line constituting the base edges (x, x, . . . ) to form a broken parallel straight-line group having equal repetitive pitches.

Therefore, though the lateral faces (faces $c_1$ and $c_2$) of the negatively-tilted triangular-pyramidal reflective element of the present invention are faced each other by sharing base edges (x, x, . . . ), the base edges (x, x, . . . ) do not constitute a continuous straight line as described above but they form a broken line broken every certain interval. Moreover, though faces $c_1$ are present on a virtual plane, they do not form a continuous plane but they form independent substantially-isosceles-triangular strings arranged in the same pattern every certain interval. The same is true for the face $c_2$. A virtual plane including a string of faces $c_1$ and a virtual plane including a string of faces $c_2$ intersect each other at base edges (x, x, . . . ) and cross sections of them form a V-shaped groove and are faced each other.

Figure 11:
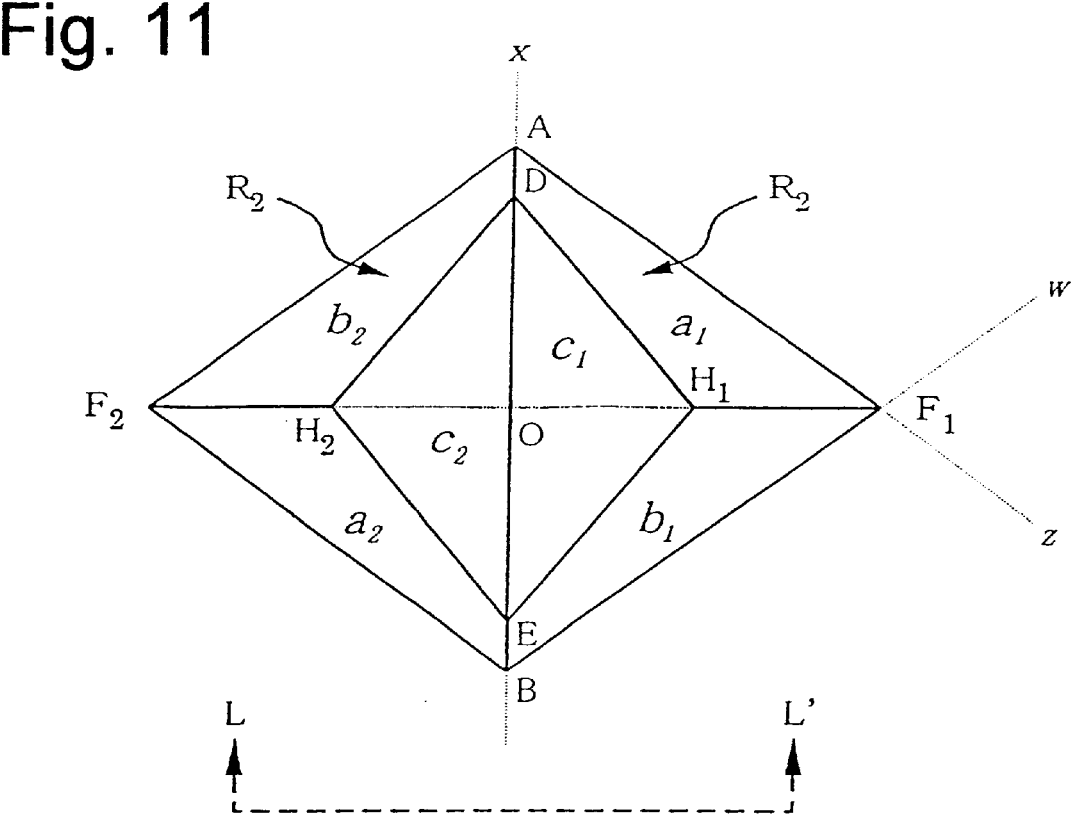
FIG. 11 is an enlarged top view of a pair of negatively-tilted triangular-pyramidal reflective elements for explaining the present invention.
Figure 12:
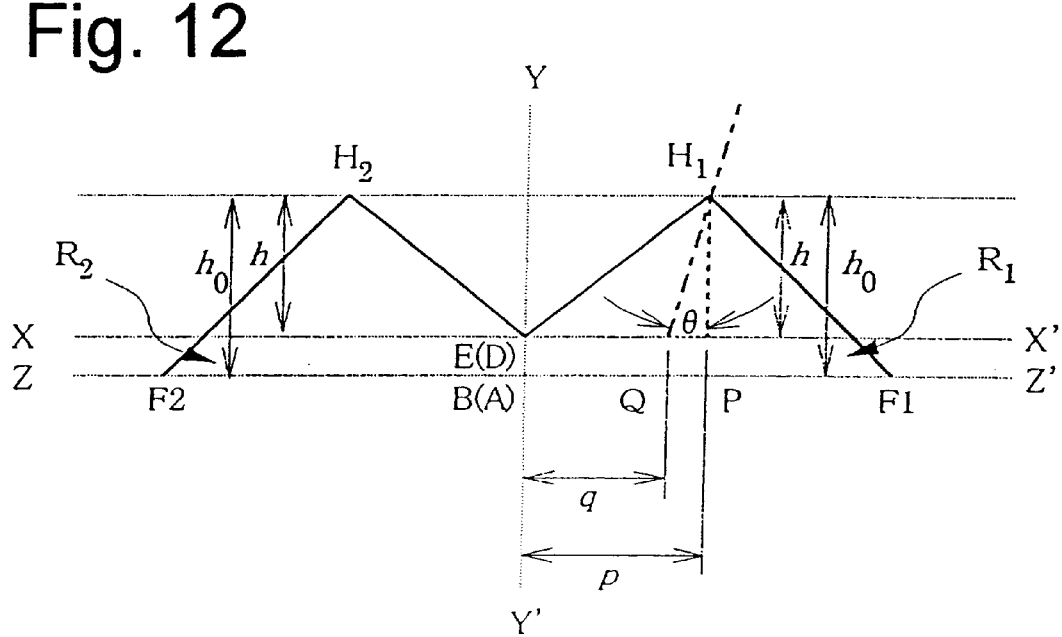
FIG. 12 is a side view of the negatively-tilted triangular-pyramidal rejective element pair shown in FIG. 11 for explaining the present invention, when viewed from the line (L–L') in FIG. 11.

To easily understand the present invention, FIG. 11 shows an enlarged top view of a pair of negatively-tilted triangular-pyramidal reflective elements shown as the following patterns in FIG. 9 and FIG. 12 shows a side view from the arrow direction shown by the line L–L' in FIG. 11.

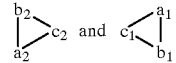

FIGS. 11 and 12 are described below. The face $c_1$ of the right element $R_1$ (that is, the element shown by the following pattern in FIG. 9) of a pair of negatively-tilted triangular-pyramidal reflective elements of the present invention is a triangular plane surrounded by points $H_1$-D-E, the face $a_1$ is a quadrangular plane surrounded by points $H_1$-$F_1$-A-D, the face $b_1$ is a quadrangular plane surrounded by points $H_1$-$F_1$-B-E, the faces $a_1$ and $b_2$ have the substantially same shape, and the faces $c_1$, $a_1$, and $b_2$ are substantially orthogonal to each other.

Moreover, the base plane of the right triangular-pyramidal reflective element $R_1$ shown by a plane A-B-$F_1$ forms a part of the horizontal plane (Z–Z') serving as a common plane.

In FIG. 12, the left triangular-pyramidal reflective element shown by $R_2$ corresponds to the left triangular-pyramidal reflective element of the above element pair shown by the following pattern in FIG. 9, the base plane of the element is shown by A-B-$F_2$, the left triangular-pyramidal reflective element $R_2$ whose base plane is shown by A-B-$F_2$ has the substantially same shape as the right reflective element $R_1$ whose base plane is shown by A-B-$F_1$ and located at the both sides of the base edge (D-E) (this is present on the shared base edge x in FIG. 3) shared by the faces $c_1$ and $c_2$ of the both elements $R_1$ and $R_2$, and the left element $R_2$ has a shape obtained by rotating the right element $R_1$ counterclockwise by 180° about the middle point (O) of the base edge (D-E) shared by the both elements $R_1$ and $R_2$ on the base plane (X–X').

Therefore, the face $c_2$ shown by points $H_2$-D-E of the left element $R_2$ in FIG. 11, the face $b_2$ shown by points $H_2$-$F_2$-A-D, and the face $a_2$ shown by points $H_2$-$F_2$-B-E have the substantially same shape and the faces $c_2$, $a_2$, and $b_2$ are also substantially orthogonal to each other.

Therefore, the height from the valley formed between lateral faces $a_1$ and $b_1$ and lateral faces $a_2$ and $b_2$ of the negatively-tilted triangular-pyramidal reflective elements $R_1$ and $R_2$ of the present invention up to the apexes $H_1$ and $H_2$ is shown as $h_0$.

Moreover, as shown in FIGS. 11 and 12, the base edge D-E shared by the faced faces $c_1$ and $c_1$ of the negatively-tilted triangular-pyramidal reflective elements $R_1$ and $R_2$ of the present invention is present on the base plane (X–X') and the height from the base plane (X–X') up to the apexes $H_1$ and $H_2$ of the elements $R_1$ and $R_2$ is shown as h in FIG. 12. Furthermore, the height h corresponds to the depth of the V-shaped valley formed by the faces $c_1$ and $c_2$ from the apexes $H_1$ and $H_2$ of the elements.

In the case of negatively-tilted triangular-pyramidal reflective elements of the present invention, base edges of the faces $a_1$ and $a_2$ of the elements $R_1$ and $R_2$ are present on a common line z as shown in FIGS. 9 and 11, base edges of the faces $b_1$ and $b_2$ are located on a common line w, and base edges of the faces $c_1$ and $c_2$ are located on a common line x.

As shown in FIGS. 9 to 12, in the case of many negatively-tilted triangular-pyramidal reflective elements of the present invention, two c faces to which the elements correspond share base edges (x, x, . . . ) and they are faced each other and arranged on a substrate in the closest-packed state.

A negatively-tilted triangular-pyramidal cube-corner retroreflective sheeting of the present invention shown in FIGS. 9 to 12 is a triangular-pyramidal cube-corner retroreflective sheeting characterized in that triangular-pyramidal cube-corner retroreflective elements protruded beyond a common base plane (X–X') are faced each other and arranged in the closest-packed state by sharing one base edge on the base plane (X–X'), the base plane (X–X') is a common plane including many base edges (x, x, . . . ) shared by the triangular-pyramidal reflective elements, the two triangular-pyramidal reflective elements faced each other constitute an element pair having substantially same shape faced so as to be respectively substantially symmetric to planes (Y–Y', Y–Y', . . . ) vertical to the base plane (X–X') including many shared base edges (x, x, . . . ) on the base plane (X–X'), the triangular-pyramidal reflective elements are constituted of substantially same triangular lateral faces (faces $c_1$ and $c_2$) using the shared base edges (x, x, . . . ) as one sides and substantially same quadrangular lateral faces (faces $a_1$ and $b_1$ and faces $a_2$ and $b_2$) substantially orthogonal to the face $c_1$ or the face $c_2$ by using upper two sides of the face $c_1$ or $c_2$ starting with apexes ($H_1$ and $H_2$) of the triangular-pyramidal reflective elements as one sides and sharing one ridge line of the triangular-pyramidal reflective elements and using the ridge line as one side, and when assuming the height from the apexes ($H_1$ and $H_2$) of the triangular-pyramidal reflective elements up to the base plane (X–X') including the base edges (x, x, . . . ) of the triangular lateral faces (faces $c_1$ and $c_2$) of the triangular-pyramidal reflective elements as (h), the height from the apexes ($H_1$ and $H_2$) of the triangular-pyramidal reflective elements up to a substantially horizontal plane (Z–Z') including base edges (z and w) of other lateral faces (faces $a_1$ and $b_2$ and faces $a_2$ and $b_2$) of the triangular-pyramidal reflective elements as ($h_0$), the intersection between a vertical line from the apexes ($H_1$ and $H_2$) of the triangular-pyramidal reflective elements to the base plane (X–X') and the base plane (X–X') as P, the intersection between an optical axis passing through the apexes ($H_1$ and $H_2$) and the base plane (X–X') as Q, and moreover, expressing distances from the intersections (P) and (Q) up to planes (Y–Y', Y–Y', . . . ) including the base edges (x, x, . . . ) shared by the triangular-pyramidal reflective elements and vertical to the base plane (X–X') as p and q, the optical axis tilts in a direction in which (q–p) becomes negative (–) and the above h and $h_0$ are not substantially equal to each other.

The present inventor et al. specified the tilt angle ($\theta$) of a retroreflective sheeting constituted of the positively-tilted or negatively-tilted triangular-pyramidal cube-corner retroreflective elements described above and the relation between the height ($h_0$) from the apexes ($H_1$ and $H_2$) up to the horizontal plane (Z–Z') of the elements and the height (h) up to the base plane (X–X') and applied the patents as described above (Japanese Patent Application Nos. 295907/1996 and 330836/1997).

The present inventor et al. further continued the study. As a result, because we found that improvements in these two applications were not necessarily sufficient, we further developed the idea of minimizing the degree in which sizes of lateral faces (faces $c_1$ and $c_2$) are relatively enlarged or contracted compared to other lateral faces (faces $a_1$ and $b_2$ and faces $a_2$ and $b_2$) which is inevitably caused by a tilt of an optical axis and reached the present invention.

However, the present inventor et al. found that a triangular-pyramidal cube-corner retroreflective sheeting improved in entrance angularity and having a superior reflection brightness can be obtained when the ratio ($h/h_0$) between the height (h) from apexes ($H_1$ and $H_2$) of two triangular-pyramidal reflective elements up to a base plane (X–X') including base edges (x, x, . . . ) common to two faced lateral faces (faces $c_1$ and $c_2$) of these two elements and the height ($h_0$) from the apexes ($H_1$ and $H_2$) of the triangular-pyramidal reflective elements up to a substantially horizontal plane (Z–Z') including base edges (z and w) of other lateral faces (faces $a_1$ and $b_1$ and faces $a_2$ and $b_2$) of the triangular-pyramidal reflective elements meets a tilt angle $\theta$ of an optical axis and a specific relational expression.

A triangular-pyramidal cube-corner retroreflective sheeting of the present invention is characterized in that the above height ratio ($h/h_0$) meets a tilt angle ($\theta$) of an optical axis and the following relational expression (1).

$$0.5R \leq \frac{h}{h_0} \leq 1.5R \tag{1}$$

(In the above expression, R denotes a value defined by the following expression.)

$$R = \frac{\sin(35.2644° - \theta) + 1.2247\sin\theta}{\sin(35.2644° - \theta)}$$

{In the above expression, it is assumed that when the above (q–p) has a negative (–) value, $\theta$ takes a negative (–) value.}

In the above expression (1), when ($h/h_0$) has a very small value such as less than 0.5R, this is not preferable because the unbalance between areas of faces c, a, and b is insufficiently improved and the front brightness of an obtained retroreflective sheeting is low, and the entrance anguarity is insufficiently improved. However, when ($h/h_0$) has a very large value exceeding 1.5R, this is not preferable because the inbalance between areas of faces c, a, and b is excessively improved. In the case of a positive tilt, the face c becomes extremely larger than the faces a and b. In the case of a negative tilt, the face c becomes extremely smaller than the faces a and b. This is not preferable because the front brightness of an obtained retroreflective sheeting is low and the entrance angularity is insufficiently improved similarly to the case of less than 0.5R.

In the above expression (1), it is preferable that ($h/h_0$) is kept in the following range.

$$0.6R \leq \frac{h}{h_0} \leq 1.4R \qquad (2)$$

It is more preferable that ($h/h_0$) is kept in the following range.

$$0.8R \leq \frac{h}{h_0} \leq 1.2R \qquad (3)$$

It is particularly preferable that ($h/h_0$) is kept in the following range.

$$0.85R \leq \frac{h}{h_0} \leq 1.15R \qquad (4)$$

R in the above expressions is defined by the above expression (1) (or defined by claim 1).

The present inventor et al. knew that it was more preferable that the rate of the difference between the value of ($h-h_0$)/$h_0$, that is, the height ($h_0$) from apexes ($H_1$ and $H_2$) of a triangular-pyramidal reflective element pair up to a horizontal plane (Z–Z') and the height (h) up to a base plane (X–X') to the height ($h_0$), in other words, the relation between a deep groove or the degree of the deep groove and a tilt angle (θ) meets the following expression (5) and it was particularly preferable that the rate meets the following expressions (5) and (6).

$$0.3(R-1) \leq \frac{h-h_0}{h_0} \leq 1.5(R-1) \qquad (5)$$

$$0.4(R-1) \leq \frac{h-h_0}{h_0} \leq 1.2(R-1) \qquad (6)$$

(In the above expressions (5) and (6), D denotes a value defined by the following expression.)

$$D = R - 1 = \frac{1.2247\sin\theta}{\sin(35.2644° - \theta)}$$

A positively- or negatively-tilted triangular-pyramidal cube-corner retroreflective sheeting of the present invention is preferable in which the optical axis of a triangular-pyramidal reflective element pair tilts by 3 to 15° from a vertical plane (Y–Y') in a direction in which the difference (p–q) between the distance (p) from the intersection (P) between a vertical line extended from apexes ($H_1$ and $H_2$) of a triangular-pyramidal reflective element pair to a horizontal plane (Z–Z') and the horizontal plane (Z–Z') up to vertical planes (Y–Y', Y–Y',) including base edges (x, x, . . . ) shared by the element pair and the distance (q) from the intersection (Q) between the optical axis of the triangular-pyramidal reflective element pair and the horizontal plane (Z–Z') up to the planes (Y–Y', Y–Y', . . . ) vertical to the base plane (X–X') including base edges (x, x, . . . ) shared by the element pair becomes positive or negative.

In the case of the present invention, when referring to FIGS. 8 to 12, a cube-corner retroreflective sheeting is preferable in which an angle (θ) from a vertical line ($H_1$-P) to the horizontal plane (Z–Z') {this can be also considered as a plane (Y–Y') vertical to the base plane (X–X')} from the apex $H_1$, of the triangular-pyramidal reflective element $R_1$ is referred to as an optical-axis tilt angle and the optical axis passing through the apex $H_1$ tilts in a direction in which the above (p–q) becomes positive or negative so that the optical-axis tilt angle (θ) ranges between 4 and 12°, particularly a triangular-pyramidal cube-corner retroreflective sheeting is preferable in which the optical axis tilts by 5° to 10° from the vertical plane (Y–Y') in a direction in which the above (p–q) becomes positive or negative.

In the case of positively-tilted triangular-pyramidal reflective elements of the present invention, the height (h) from the apexes ($H_1$ and $H_2$) of the reflective elements up to the base plane (X–X') including base edges (x, x, . . . ) shared by the element pair is substantially larger than the height ($h_0$) from the apexes ($H_1$ and $H_2$) of the triangular-pyramidal reflective elements the substantially horizontal plane (Z–Z') substantially including base edges (z and w) as shown in FIG. 8. Therefore, various optical characteristics are improved.

The above improvement can be realized because h is substantially larger than $h_0$ and thereby, it is possible to increase the area of the face $c_1$ compared to the area of the lateral face $c_1$ of the prior art in which h is equal to $h_0$. Particularly, in the case of light almost-vertically entering the face $c_1$, in other words, light having a large entrance angle, the entrance angularity is remarkably improved because the area of the face $c_1$ is increased.

In the case of a negatively-tilted triangular-pyramidal reflective elements of the present invention, the height (h) from apexes ($H_1$ and $H_2$) of the reflective elements up to the base plane (X–X') including base edges (x, x, . . . ) shared by the element pair is substantially smaller than the height ($h_0$) from the apexes ($H_1$ and $H_2$) of the triangular-pyramidal reflective elements up to the substantially horizontal plane (Z–Z') including base edges (z and w). Therefore, various optical characteristics are improved.

The above improvement can be realized because h is substantially smaller than $h_0$ and thereby it is possible to decrease the area of the face $c_1$ compared to the area of the lateral face $c_1$ of the conventional art in which h is equal to $h_0$, in other words, it is possible to make the area of the face $a_1$ relatively larger than that of the face $b_1$. Particularly, in the case of light almost vertically entering the faces $a_1$ and $b_1$, in other words, light having a large entrance angle, the entrance angularity is remarkably improved because areas of the faces $a_1$ and $b_2$ are increased.

In the case of the present invention, the entrance angularity is improved because an optical axis tilts so that the above (q–p) becomes positive or negative. A triangular-pyramidal reflective element with an optical axis tilted according to the prior art has disadvantages that a normal triangular-pyramidal reflective element with an optical axis not tilted tilts its optical axis so that the above (q–p) becomes positive or negative, thereby areas of lateral faces (faces $c_1$ and $c_2$) having a common base edge (x) are decreased compared to areas before tilted in positive tilt but increases in negative tilt, the difference between sizes of two other faces $a_1$ and $b_2$ becomes remarkable, and the probability of causing three-face reflection and then retroreflection is deteriorated. For the incoming light to reflect from three tilted side faces and efficiently retroreflect, it is preferable that areas of three lateral faces are equal to each other as described above. In the case of a tilted triangular-pyramidal reflective element of the prior art, however, the probability of causing three-face reflection and then retroreflection described above is deteriorated because the difference between areas of lateral faces (faces $c_1$ and $c_2$) having a common base edge becomes remarkable compared to the case of two other faces (face $a_1$ and $b_1$ and faces $a_2$ and $b_2$) as a tilt angle increases. Therefore, not only the retroreflective performance of the light incoming from the front (front reflection brightness) is deteriorated but also the retroreflective performance when an entrance angle increases (entrance angularity) is deteriorated.

When an optical axis tilts so that (p–q) becomes positive (+), areas of lateral faces (faces $c_1$ and $c_2$) of a triangular-pyramidal reflective element decreases to approx. 91% when an optical-axis tilt angle ($\theta$) is +3°, to approx. 86% when the tilt angle ($\theta$) is +4°, and to approx. 62% when the tilt angle ($\theta$) is +12°, compared to areas before the optical axis tilts. When the optical axis tilts so that (p–q) becomes negative (–), areas of lateral faces (faces $a_1$ and $b_1$ and faces $a_2$ and $b_2$) decreases to approx. 90° when an optical-axis tilt angle ($\theta$) is –3°, to approx. 87% when the tilt angle ($\theta$) is –4°, and to approx. 65% when the tilt angle ($\theta$) is –12°, compared to areas before the optical axis tilts.

In the case of positively-tilted triangular-pyramidal reflective elements of the present invention, however, it is possible to increase areas of lateral faces (faces $c_1$ and $c_2$) compared to areas of tilted side faces of a triangular-pyramidal reflective elements formed in accordance with the prior art because the positively-tilted triangular-pyramidal reflective elements are designed so that the height (h) from apexes ($H_1$ and $H_2$) up to a base plane (X–X') is substantially larger than the height ($h_0$) up to a horizontal plane (Z–Z'). In the case of negatively-tilted triangular-pyramidal reflective elements of the present invention, however, it is possible to increase areas of two lateral faces (faces $a_1$ and $b_1$ and faces $a_2$ and $b_2$) compared to tilted side faces of triangular-pyramidal reflective elements formed in accordance with the prior art because the negatively-tilted triangular-pyramidal reflective elements are designed so that the height (h) from apexes ($H_1$ and $H_2$) up to a base plane X–X') is substantially smaller than the height ($h_0$) up to a horizontal plane (Z–Z').

Thus, a triangular-pyramidal reflective element of the present invention particularly makes it possible to improve the disadvantage that brightness is deteriorated due to the unbalance between areas of faces a, b, and c of the element caused by tilting an optical axis so that its tilt angle ($\theta$) indicates 3° to 15° in a direction in which (p–q) becomes negative (–) or positive (+).

Because of the above reason, in the case of the present invention, it is preferable to tilt an optical axis so that its tilt angle ($\theta$) indicates 40° to 12°, preferably 5° to 10° in a direction in which (q–p) becomes negative (–) or positive (+). In the case of a triangular-pyramidal reflective element in which its optical axis tilts by an angle exceeding 15° in a direction in which the tilt angle ($\theta$) of the optical axis becomes negative (–) or positive (+), the element is excessively deformed and thereby, the rotation angularity tends to deteriorate because reflection brightness greatly depends on the direction of light entering the element (rotation angle).

It is preferably recommended that the height ($h_0$) from apexes ($H_1$ and $H_2$) of triangular-pyramidal reflective elements of the present invention up to a horizontal plane (Z–Z') ranges between 50 and 400 $\mu$m, more preferably between 60 and 200 $\mu$m. When the height ($h_0$) is less than 50 $\mu$m, the size of an element becomes too small and thereby, divergence of retroreflected light is excessively increased due to the diffraction effect determined by a bottom opening area of an element and the front brightness characteristic tends to deteriorate. Moreover, when the height ($h_0$) exceeds 400 $\mu$m, the thickness of a sheeting becomes excessive and thereby, a flexible sheeting cannot be easily obtained.

Furthermore, three prism face angles formed by the fact that three lateral faces (faces $a_1$, $b_1$, and $c_1$) or (faces $a_2$, $b_2$, and $c_2$) serving as prism faces of a triangular-pyramidal reflective element of the present invention intersect each other substantially becomes right angles. However, it is not always necessary that they are strictly right angles. It is also possible to provide a very small angle deviation from right angle according to necessity. By providing a very slight angle deviation for the prism face angles, it is possible to properly emanate the light reflected from an obtained triangular-pyramidal reflective element. However, when excessively increasing the angle deviation, the retroreflective performance is deteriorated because the light reflected from the obtained triangular-pyramidal reflective element extremely emanates. Therefore, it is preferable to keep at least one prism face angle formed when these three lateral faces (faces $a_1$, $b_1$, and $c_1$ or faces $a_2$, $b_2$, and $c_2$) intersect each other generally in a range of 89.5° to 90.5°, preferably in a range of 89.7° to 90.3°.

It is possible to generally manufacture a triangular-pyramidal cube-corner retroreflective sheeting of the present invention by using a cube-corner molding die in which shapes of the above-described triangular-pyramidal reflective elements are arranged on a metallic belt in the closest-packed state as inverted concave shapes and thereby, thermally pressing a proper flexible resin sheeting superior in optical transparency and uniformity to be described later against the molding die and inversely transferring the die shape to the resin sheeting.

A typical manufacturing method of the above cube-corner molding die is disclosed in, for example, the above Stamm's U.S. Pat. No. 3,712,707 in detail and it is possible to adopt a method conforming to the above method for the present invention.

Specifically, parallel grooves having the same depth ($h_0$) and a V-shaped sectional form is cut on a substrate whose surface is flatly ground by using a carbide cutting tool having a point angle of 73.4 to 81.0° for positive tilt or having a point angle of 66.4 to 537° for negative tilt (e.g. diamond cutting tool or tungsten-carbide cutting tool) and thereby deciding a repetitive pitch, a groove depth ($h_0$), and a mutual crossing angle in accordance with the shape of a purposed triangular-pyramidal reflective element in two directions (z direction and w direction in FIG. 3) and then, a microprism mother die is formed in which convex very-small triangular pyramids are arranged in the closest-packed state by using a carbide cutting tool having a point angle of 64.5 to 46.5° for positive tilt and having a point angle of 78.5 to 100.5° for negative angle and thereby cutting a V-shaped parallel groove at a repetitive pitch (repetitive pitch of line x in FIG. 3) passing through the intersection between the formed z-directional groove and w-directional groove and bisecting a supplementary angle of the crossing angle of these two directions (in this case, the acute angle is referred to as "crossing angle") in the third direction (x direction). In this case, the present invention performs cutting by adjusting the depth ($h_0$) of the x-directional groove so that it is deeper than the depth ($h_0$) of the z- and w-directional grooves for positive tilt and shallower than the depth ($h_0$) of the z-and w-directional grooves for negative tilt.

In the case of a preferred mode of a positively-tilted reflective element of the present invention, the z- and w-directional repetitive pitch ranges between 100 and 810 $\mu$m, the groove depth ($h_0$) ranges between 50 and 400 $\mu$m, the mutual crossing angle ranges between 43 and 55°, and the x-directional groove depth ($h_0$) ranges between 75 and 600 $\mu$m. In the case of a preferred mode of a negatively-tilted reflective element, a z- and w-directional repetitive pitch ranges between 104 and 992 $\mu$m, the groove depth ($h_0$) ranges between 50 and 400 $\mu$m, the mutual crossing angle ranges between 64.7 and 75.1°, and the x-directional groove depth ($h_0$) ranges between 33 and 380 μm.

Cutting of x-, w-, and z-directional grooves is generally performed so that the cross section of each groove becomes isosceles triangular. However, it is also possible to cut these three directional grooves so that the cross section of at least one-directional groove is slightly deviated from an isosceles triangular shape. A method of cutting a groove by using a cutting tool whose front-end shape is asymmetric to right and left or a method of cutting a groove by slightly tilting a cutting tool symmetric to right and left can be listed. Thus, by slightly shifting the cross section of a groove from an isosceles triangular shape, it is possible to provide an angle deviation slightly deviated from right angle (90°) for at least one of prism face angles of three lateral faces (faces $a_1$, $b_1$, and $c_1$ or faces $a_2$, $b_2$, and $c_2$) of an obtained triangular-pyramidal reflective element and thereby, it is possible to properly emanate the light reflected from a triangular-pyramidal reflective element from a complete retroreflective direction.

It is preferable to use a metal having a Vickers hardness (JIS Z 2244) of 350 or more, particularly 380 or more as a substrate which can be preferably used to form the above microprism mother die. Specifically, amorphous copper, electrodeposited nickel, or aluminum can be used as the substrate. Moreover, a copper-zinc alloy (brass), copper-tin-zinc alloy, nickel-cobalt alloy, nickel-zinc alloy, or aluminum alloy can be used as the substrate.

It is also possible to use a synthetic resin as the above substrate. It is preferable to use a material made of a synthetic resin having a glass transition point of 150° C. or higher, particularly 200° C. or higher and a Rockwell hardness (JIS Z 2245) of 70 or more, particularly 75 or more as the above substrate because a synthetic resin does not easily cause a trouble that the resin is softened under cutting to make high-accuracy cutting difficult. Specifically, one of the following materials can be used: polyethylene-terephthalate-based resin, polybutylene-phthalate-based resin, polycarbonate-based resin, polymethyl-methacrylate-based resin, polyimide-based resin, polyarylate-based resin, polyhether-sulfone-based resin, polyetherimide-based resin, and cellulose-triacetate-based resin.

To form a flat plate by one of the above synthetic resins, it is possible to use the normal resin forming method such as extrusion molding method, calender molding method, or solution casting method and moreover perform heating and extending according to necessity. Thus, it is possible to apply the preparatory conduction treatment to the plane of the flat plate thus formed in order to simplify the conduction treatment and/or electroforming for forming an electroforming die from a prism mother die formed in accordance with the above method. For the preparatory conduction treatment, one of the following methods can be used: vacuum evaporation method for vacuum-evaporating such metals as gold, silver, copper, aluminum, zinc, chromium, nickel, and selenium; cathode sputtering method using the above metals, and electroless plating method using copper or nickel. Moreover, it is allowed to make the flat plate conductive by mixing conductive impalpable powder such as carbon black or the like or organometallic salt into a synthetic resin.

Then, the surface of the obtained microprism mother die is electroformed and a metallic film is formed. By removing the metallic film from the surface of the mother die, it is possible to form a metallic die for forming a triangular-pyramidal cube-corner retroreflective sheeting of the present invention.

In the case of a metallic mother die, it is possible to electroform the mother die immediately after cleaning the surface of the die according to necessity. In the case of a synthetic-resin microprism mother die, however, it is necessary to apply conduction treatment to the prism surface of the mother die in order to make the surface conductive before electroforming the mother die. As the conduction treatment, it is possible to use silver mirroring, electroless plating, vacuum evaporation, or cathode sputtering.

Specifically, as the above silver mirroring, a method can be used in which the surface of a mother die formed in accordance with the above method is cleaned with an alkaline detergent to remove contamination such as oil component and the like, then activated by a surface-active agent such as tannic acid, and then silver-mirrored by a silver-nitrate aqueous solution. The silver mirroring can adopt the spraying method using a two-cylinder nozzle gun storing a silver-nitrate aqueous solution and a reducing agent (grape sugar or glyoxal) aqueous solution or the dipping method for dipping an object in a mixed solution of a silver-nitrate aqueous solution and a reducing-agent aqueous solution. Moreover, it is preferable that a silver-mirrored film has a thickness as small as possible in a range in which the conductivity under electroforming is satisfied such as a thickness of 0.1 μm.

Electroless plating uses copper or nickel. An electroless nickel plating solution can use nickel sulfate or nickel chloride as water-soluble metallic salt of nickel. A plating solution is used which is obtained by adding a solution mainly containing citrate and malate respectively serving as a complexing agent, and sodium hypophosphite, boronized hydrogen sodium, and amine borane respectively serving as a reducing agent to the electroless nickel plating solution.

Vacuum evaporation can be performed by cleaning the surface of a mother die, then putting the die in a vacuum system, thermally evaporating gold, silver, copper, aluminum, zinc, nickel, chromium, and selenium, precipitating them on the cooled mother-die surface, and forming a conductive film. Moreover, cathode sputtering can be performed by putting a mother die treated similarly to the case of the vacuum evaporation in a vacuum system in which a cathode plate capable of mounting a smooth and desired metallic foil and an anode table made of a metal such as aluminum or iron for mounting a material to be treated and setting the mother die on the anode table, setting a metallic foil same as that used for the vacuum evaporation to a cathode and electrifying the foil to cause glow discharge, making an anode-ion flow generated by the glow discharge collide with the cathode metallic foil and thereby evaporating metallic atoms or particles, precipitating the metallic atoms or particles on the surface of the mother die, and forming a conductive film. The thickness of a conductive film formed by one of the above methods is 30 nm.

To form a smooth and uniform electroformed layer on a prism mother die made of a synthetic resin through electroforming, it is necessary to uniformly apply conduction treatment to the entire surface of the mother die. When conductive treatment is uniformly performed, a trouble may occur that the smoothness of the surface of the electroformed layer at a portion inferior in conductivity is deteriorated or no electroformed layer is formed but a defective portion is formed.

To avoid the above trouble, it is possible to use a method of improving the wetness of a silver-mirrored film by treating a treatment face with a solvent such as alcohol immediately before silver mirroring. However, because a synthetic-resin prism mother die formed for the present invention has a very deep acute-angle concave portion, wetness tends to be incompletely improved. The trouble of a conductive film due to the concave portion also easily occurs in vacuum evaporation.

To uniform the surface of an electroformed layer obtained through electroforming, activation is frequently performed. The activation can use a method of dipping an object in a 10-wt % sulfamic-acid aqueous solution.

When electroforming a silver-mirrored synthetic-resin mother die, a silver layer is integrated with an electroformed layer and easily separated from the synthetic-resin mother die. However, when forming a conductive film made of nickel or the like through electroless plating or cathode sputtering, it may be difficult to separate an electroformed layer from a synthetic-resin layer after electro-forming because the synthetic-resin surface easily closely-contacts with the conductive film. In this case, it is preferable to apply the so-called separation treatment such as chromate treatment onto the conductive layer before electroforming. In this case, the conductive layer remains on the synthetic-resin layer after separated.

The synthetic-resin prism mother die on which the conductive film is formed undergoes the above various pretreatments and then, an electroformed layer is formed on the conductive film through electroforming. In the case of metallic prism mother die, the surface of the die is cleaned according to necessity and then, an electroformed layer is directly formed on the metal.

Electroforming is generally performed in a 60-wt % nickel-sulfamate aqueous solution at 40° C. and a current of approx. 10 A/dm$^2$. A uniform electroformed layer is easily obtained by setting an electroformed-layer forming rate to, for example, 48 hr/mm or less. However, at a forming rate of more than 48 hr/mm, a trouble easily occurs that the surface smoothness is deteriorated or a defective portion is easily formed in an electroformed layer.

In the case of electroforming, it is also possible to perform nickel-cobalt-alloy electroforming to which a component such as cobalt is added in order to improve the die-surface abrasion characteristic. By adding 10 to 15 wt % of cobalt, it is possible to improve the Vickers hardness Hv of an obtained electroformed layer up to 300 to 400. Therefore, it is possible to form a synthetic resin by an obtained electroformed die and improve the durability of the die in order to manufacture a triangular-pyramidal cube-corner retroreflective sheeting of the present invention.

A first-generation electroforming die thus formed from a prism mother die can be repeatedly used as an electroforming master used to form a second-generation electroforming die. Therefore, it is possible to form many electroforming dies from one prism mother die.

A plurality of electroforming dies formed are precisely cut, combined and joined up to a final die size for forming a microprism sheeting and used. To join the electroforming dies, it is possible to use a method of merely butting cut end faces each other or a method of welding combined joints through electron-beam welding, YAG laser welding, or carbon-dioxide laser welding.

A combined electroforming die is used to mold a synthetic resin as a synthetic-resin molding die. As the synthetic-resin molding method, it is possible to use compression molding or injection molding.

Compression molding can be performed by inserting a formed thin-wall nickel electroforming die, a synthetic-resin sheeting having a predetermined thickness, and a silicon-rubber sheeting having a thickness of approx. 5 mm as a cushion material into a compression-molding press heated to a predetermined temperature, then preheating them at a pressure of 10 to 20% of a molding pressure for 30 sec, and then heating and pressing them for approx. 2 min under a condition of 10 to 30 kg/cm$^2$. Thereafter, it is possible to obtain a prism molding product by lowering the temperature up to room temperature while pressed and releasing the pressure.

Moreover, it is possible to obtain a continuous-sheetinglike product by joining a thin-wall electroforming die having a thickness of approx. 0.5 mm formed by the above method through the above welding method to form an endless belt die, setting the belt die on a pair of rollers constituted of a heating roller and a cooling roller and rotating the belt die, supplying melted synthetic resin in the form of a sheeting to pressure-mold the melted synthetic resin with one silicone roller or more and then, cooling the resin to the glass transition point or lower on the cooling roller, and separating the resin from the belt die.

Figure 13:
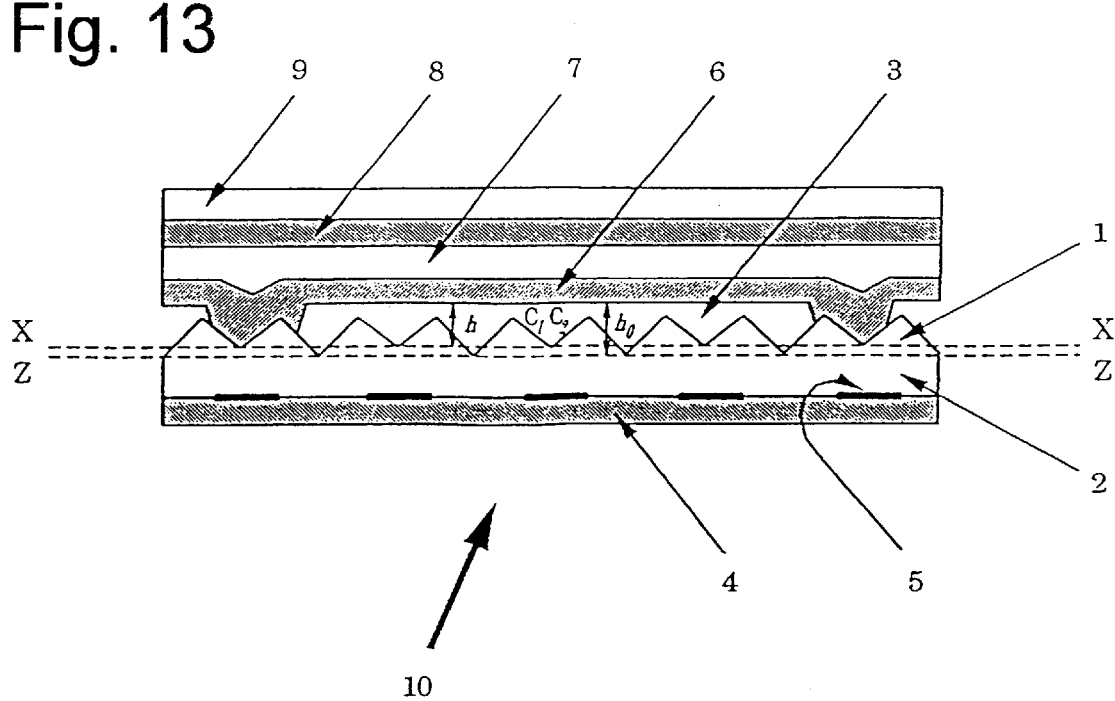
FIG. 13 is a sectional view showing a structure of a negatively-tilted re/reflective sheeting that is one of modes of a triangular-pyramidal cube-corner retroreflective sheeting of the present invention.

Then, a negatively-tilted triangular-pyramidal cube-corner retroreflective sheeting which is one mode of a preferred structure of a triangular-pyramidal cube-corner retroreflective sheeting of the present invention is described below by referring to FIG. 13 showing a sectional view of the negatively-tilted triangular-pyramidal cube-corner retroreflective sheeting.

In FIG. 13, symbol (1) denotes a reflective element layer in which triangular-pyramidal reflective elements ($R_1$ and $R_2$) of the present invention are arranged in the closest-packed state, (2) denotes a holder layer for holding the reflective elements, and (10) denotes a light entrance direction. Though the reflective element layer (1) and holder layer (2) are normally united into one body, it is also allowed to superpose separate layers each other. Correspondingly to the purpose and working environment of a retroreflective sheeting of the present invention, it is possible to form a surface protective layer (4), a printing layer (5) for communicating information to an observer or coloring a sheeting, a binder layer (6) for achieving an enclosing-sealing structure for preventing moisture from entering the back of a reflective element layer, an air layer (3) enclosed by the reflective element layer (1) and binder layer (6) to assure retroreflection at an interface between reflective elements, a support layer (7) for supporting the binder layer (6), an adhesive layer (8) used to attach the retroreflective sheeting to other structure, and a separating-material layer (9).

It is possible to use the same resin as that used for the retroreflective element layer (1). Moreover, to improve the weather resistance, it is possible to use an ultraviolet absorbent, light stabiizer, and antioxidant independently or by combining them. Moreover, it is possible to add various organic pigments, inorganic pigments, and dyes as colorants.

It is generally possible to set the printing layer (5) between the surface protective layer (4) and holder layer (2) or on the surface protective layer (4) or the reflection face of a reflective element (1) by means of gravure printing, screen printing, or ink jet printing.

Though any material can be used as a material constituting the reflective element layer (1) and holder layer (2) as long as the material meets flexibility which is one of the objects of the present invention, it is preferable to use a material having optical transparency and uniformity. The following materials can be used for the present invention: olefin resins such as polycarbonate resin, vinyl chloride resin, (meth)acrylic resin, epoxy resin, styrene resin, polyester resin, fluorine resin, and polypropylene resin; cellulose-based resins; and urethane resin.

It is general to set the air layer (3) to the back of a cube-corner retroreflective element in order to increase a critical angle for meeting an internal total-reflection condition. It is preferable that the reflective element layer (1) and support layer (7) are enclosed and sealed by the binder layer (6) in order to prevent such troubles as decrease of a critical angle and corrosion of a metal layer due to moisture under a working condition. The above enclosing and sealing method can use one of the methods disclosed in the UP Pat. Nos. 3,190,178 and 4,025,159 and Japanese Utility Model Laid-Open No. 28669/1975. It is possible to use one of the resins such as (meth)-acrylic resin, polyester resin, alkyd resin, and epoxy resin for the binder layer (6). As a joining method, it is possible to properly use the publicly-known thermal-fusion-resin joining method, thermosetting-resin joining method, ultraviolet-curing-resin joining method, or electron-beam-curing-resin joining method.

It is possible to apply the binder layer (6) to the entire surface of the support layer (7) and selectively set the layer (6) to a joint with a retroreflective element layer by a method such as the printing method.

It is possible to use a resin constituting a retroreflective element, general film-moldable resin, fiber, cloth, metallic foil of stainless steel or aluminum, or plate as a material constituting the support layer (7) independently or by combining them.

As the adhesive layer (8) used to attach a retroreflective sheeting of the present invention to a metallic plate, wooden plate, glass plate, or plastic plate and the separating-material layer (9), it is possible to properly select a publicly-known material.

The present invention is more minutely described below by referring to embodiments and comparative examples.

Embodiment 1

A parallel groove having a V-shaped cross section was cut on a brass plate of 50-mm square whose surface was flatly ground through the fly cutting method at a repetitive pattern in the first direction (z direction in FIG. 5) and the second direction (w direction in FIG. 5) by using a diamond cutting tool having a point angle of 77.04° so that the first- and second-directional repetitive pitch is 169.70 μm, the groove depth ($h_0$) is 80.00 μm, and the crossing angle between lines z and w shown by <A-$K_1$-B in FIG. 7 becomes 50.68°.

Thereafter, a V-shaped groove was cut in the third direction (x direction) by using a diamond cutting tool having a point angle of 56.53° so that the repetitive pitch (repetitive pitch of line x in FIG. 3) was 198.26 μm, the groove depth ($h_0$) was 92.00 μm, and the crossing angle between the first and second directions on one hand and the third direction on the other became 64.66° to form a mother die obtained by arranging many convex positively-tilted triangular-pyramidal retroreflective elements in which the height ($h_0$) from the horizontal plane (Z–Z') of triangular-pyramidal reflective elements up to the apexes ($H_1$ and $H_2$) of the triangular-pyramidal reflective elements was 80.00 μm and the height ($h_0$) from the base plane (X–X') up to the apexes ($H_1$ and $H_2$) of the triangular-pyramidal reflective elements was 92.00 μm on a brass plate in the closest-packed state. The optical-axis tilt angle of the triangular-pyramidal retroreflective element was +7°. Moreover, because $h/h_0$ is 92/80=1.15, $(h-h_0)/h_0$ becomes 0.15. Moreover, $$R = \frac{\sin(35.2644° - \theta) + 1.2247\sin\theta}{\sin(35.2644° - \theta)} = 1.315$$

Therefore, D=R−1=0.315 was obtained. From these facts, obtained triangular-pyramidal reflective elements showed $h/h_0$=0.875R and $(h-h_0)/h_0$=0.476.

A concave cube-corner-molding die which was made of nickel and whose shape was inverted was formed through electroforming by using the above brass mother die. A triangular-pyramidal cube-corner retroreflective sheeting made of polycarbonate was formed on whose surface positively-tilted triangular-pyramidal retroreflective elements in which the thickness of a support layer was approx. 150 μm, $h_0$ was 80 μm and h was 92 μm, and an angle deviation was not provided for prism face angles of three faces constituting a triangular pyramid were arranged in the closest-packed state by using the above molding die and thereby, compression-molding a polycarbonate-resin sheeting ("IUPILON E2000 made by Mitsubishi Engineering Plastics Corp.) having a thickness of 230 μm at a molding temperature of 200° C. and a molding pressure of 50 kg/cm², then cooling the sheeting up to 30° C. under a pressure, and then taking out the sheeting.

Embodiment 2

A mother die obtained by arranging many convex triangular-pyramidal cube corners in which the height ($h_0$) from the horizontal plane (Z–Z') of triangular-pyramidal reflective elements was 80.00 μm and the height ($h_0$) from the base plane (X–X') up to apexes ($H_1$ and $H_2$) of the triangular-pyramidal reflective elements was 64.00 μm in the closest-packed state was formed on a brass plate similarly to the case of the embodiment 1 except that cutting was performed through the fly cutting method along the first direction (z direction) and the second direction (w direction) by using a diamond cutting tool having a point angle of 63.11° so that the first- and second-directional repetitive pitch was 149.33 μm, the cut-groove depth ($h_0$) was 80.00 μm, and the crossing angle between the first and second directions became 67.85° instead of performing cutting along the first direction (z direction) and the second direction (w direction) by using a diamond cutting tool having a point angle of 77.04° so that the first- and second-directional repetitive pitch was 169.70 μm, the groove depth ($h_0$) was 80.00 μm, and the crossing angle between the first and second directions became 50.68° and cutting was performed by using a diamond cutting tool having a third-directional (x-directional) point angle of 84.53° so that the repetitive pitch was 146.19 μm, the cut-groove depth was 64.00 μm, and the crossing angle between the first and second directions on one hand and the third direction on the other became 56.08° instead of cutting a V-shaped parallel groove by using a diamond cutting tool having a third-directional (x-directional) point angle of 56.53° so that the repetitive pitch was 198.26 μm, the groove depth (h) was 92.00 μm, and the crossing angle between the first and second directions on one hand and the third direction on the other became 64.66°. The optical-axis tilt angle θ of the triangular-pyramidal reflective element was equal to −7°. Moreover, $h/h_0$ was equal to 64/80=0.80, $(h-h_0)/h_0$ was equal to −0.20, R was equal to 0.7781, and D was equal to R−1=−0.2219. From these facts, an obtained triangular-pyramidal reflective element showed $h/h_0$=1.028R and $(h-h_0)/h_0$=0.901D.

Then, similarly to the case of the embodiment 1, a concave cube-corner-molding die made of nickel was formed by using the die and a triangular-pyramidal cube-corner retroreflective sheeting made of polycarbonate resin was formed on whose surface negatively-tilted triangular-pyramidal retroreflective elements in which the thickness of a support layer was approx. 150 μm, $h_0$ was 80 μm and h was 64 μm, and an angle deviation was not provided for prism face angles of three faces constituting a triangular pyramid were arranged in the closest-packed state.

Comparative Example 1

A mother die obtained by arranging many convex triangular-pyramidal cube corners in which the height ($h_0$=h) of a cube-corner retroreflective element was 80.00 μm on a brass plate in the closest-packed state was formed similarly to the case of the embodiment 1 except that cutting was performed through the fly cutting method so that the first- and second-directional repetitive pitch became 164.18 μm instead of performing cutting through the fly cutting method so that the first- and second-directional repetitive pitch became 169.70 μm and cutting was performed so that the third-directional (x-directional) repetitive pitch became 191.81 μm and the cut-groove depth (h) became 80.00 μm instead of cutting a V-shaped parallel groove so that the third-directional (x-directional) repetitive pitch became 198.26 μm and the groove depth (h) became 92.00 μm. The optical-axis tilt angle θ of the reflective element was +7° and prism face angles of three faces constituting a triangular pyramid were all 90°.

Thereafter, a concave cube-corner molding die made of nickel was formed similarly to the case of the embodiment 1 and thereby, a polycarbonate-resin sheeting same as the case of the embodiment 1 was compression-molded under the molding condition same as the case of the embodiment 1 to form a triangular-pyramidal cube-corner retroreflective sheeting made of polycarbonate resin on whose surface positively-tilted triangular-pyramidal retroreflective elements in which the thickness of a support layer was approx. 150 μm, $h_0$ was equal to h=80 μm and an angle deviation was provided for prism face angles of three faces constituting a triangular pyramid were arranged was formed.

Comparative Example 2

A mother die obtained by arranging many convex triangular-pyramidal cube corners in which the height ($h_0$=h) of a cube-corner retroreflective element was 80.00 μm were arranged on a brass plate in the closest-packed state was formed similarly to the case of the embodiment 1 except that cutting was performed through the fly cutting method by using a diamond cutting tool having a point angle of 63.11° so that the first- and second-directional repetitive pitch became 179.40 μm and the crossing angle between the first and second directions became 67.85° instead of performing cutting through the fly cutting method in the first (z direction) and second direction (w direction) by using a diamond cutting tool having a point angle of 77.04° so that the first- and second-directional repetitive pitch became 169.70 μm and the crossing angle between the first and second directions became 50.68° and performing cutting by using a diamond cutting tool having a third-directional (x-directional) point angle of 84.53° so that the repetitive pitch became 160.73 μm and the cut-groove depth (h) became 80.00 μm, and the crossing angle between the first and second directions on one hand and the third direction on the other became 56.08° instead of performing cutting a V-shaped groove by using a diamond cutting tool having a third-directional (x-directional) point angle of 56.53° so that the repetitive pitch became 198.26 μm, the groove depth (h) became 92.00 μm, and the crossing angle between the first and second directions on one hand and the third direction on the other became 64.66°. The optical-axis tilt angle θ of the reflective element was −7 and prism face angles of three faces constituting a triangular pyramid were all 90°.

Hereafter, similarly to the case of the embodiment 1, a concave cube-corner molding die made of nickel was formed and thereby, a polycarbonate-resin sheeting same as the case of the embodiment 1 was compression-molded under the same molding condition as the case of the embodiment 1 to form a triangular-pyramidal cube-corner retroreflective sheeting made of polycarbonate on whose surface negatively-tilted triangular-pyramidal retroreflective elements in which the thickness of a support layer was approx. 150 μm, $h_0$ was equal to h=80 μm, and an angle deviation was not provided for prism face angles of three faces constituting a triangular pyramid were arranged in the closest-packed state.

Table 1 shows measured data for retroreflection brightness of triangular-pyramidal cube-corner retroreflective sheetings formed for the above embodiments 1 and 2 and comparative examples 1 and 2. The retroreflective sheetings of the embodiments 1 and 2 showed a high reflection brightness in a wide range. However, the reflective sheeting of the comparative example 1 has a particularly large brightness change at an entrance angle of 50 to 100 and the reflective sheeting of the comparative example 2 has a large brightness deterioration at an entrance angle of 30°. Therefore, these two comparative examples are inferior in entrance angularity.

TABLE 1

| Entrance angle (Degree) | Observation angle (Degree) | Embodiment 1 | Embodiment 2 | Comparative example 1 | Comparative example 2 |
|---|---|---|---|---|---|
| 5 | 0.2 | 1120 | 1080 | 820 | 780 |
|   | 0.33 | 612 | 580 | 430 | 390 |
| 10 | 0.2 | 910 | 830 | 580 | 515 |
|   | 0.33 | 450 | 460 | 250 | 235 |
| 30 | 0.2 | 720 | 730 | 430 | 380 |
|   | 0.33 | 230 | 320 | 80 | 91 |

The present invention is a triangular-pyramidal cube-corner retroreflective sheeting characterized in that triangular-pyramidal cube-corner retroreflective elements protruded beyond a common base plane (X–X') share a base edge (x) on the base plane and they are faced each other and arranged on the base plane, the two faced triangular-pyramidal reflective elements form an element pair faced each other so as to be substantially symmetric to planes (Y–Y', Y–Y', . . . ) vertical to the base plane including the shared base edge (x) on the base plane and having the substantially same shape and the triangular-pyramidal reflective elements are constituted of a substantially-same hexagonal or triangular lateral face (face c) using the shared base edge (x) as one side and substantially-same quadrangular lateral faces (faces a and b) using two upper sides of the face c starting with the apex (H of the triangular-pyramidal reflective elements as one sides and sharing one ridge line of the triangular-pyramidal reflective elements and using the ridge line as one side and substantially orthogonal to the face $c_1$ and when assuming the height from the apex (h) of the triangular-pyramidal reflective elements up to the base plane (X–X') as (h), the height up to a substantially-horizontal plane (Z–Z') including base edges (z and w) of lateral faces (faces a and b) as ($h_0$), and the angle formed between the optical axis of the triangular-pyramidal reflective elements and the vertical plane (Y–Y') as (θ), h and $h_0$ are not substantially equal to each other and h/$h_0$ and θ meet a specific relational expression.

Thereby, a retroreflective sheeting of the present invention makes it possible to improve not only the high brightness characteristic, that is, the level (magnitude) of the reflection brightness represented by the reflection brightness of the light incoming from the front of the sheeting but also wide angularities such as observation angularity, entrance angularity, rotation angularity.

What is claimed is:

1. A triangular-pyramidal cube-corner retroreflective sheeting characterized in that triangular-pyramidal cube-corner retro-reflective elements protruded beyond a common base plane (X–X') are faced each other and arranged on the base plane (X–X') in the closest-packed state by sharing one base edge on the base plane (X–X'), the base plane (X–X') is a common plane including many base edges (x, x, . . . ) shared by the triangular-pyramidal reflective elements, the two triangular-pyramidal reflective elements faced each other constitute an element pair having substantially same shape faced so as to be respectively substantially symmetric to planes (Y–Y', Y–Y', . . . ) vertical to the base plane (X–X') including many shared base edges (x, x, . . . ) on the base plane (X–X'), the triangular-pyramidal reflective elements are constituted of substantially same hexagonal or triangular lateral faces (prism faces) (faces $c_1$ and $c_2$) using the shared base edges (x, x, . . . ) as one sides and substantially same quadrangular lateral faces (faces $a_1$ and $b_1$ and faces $a_2$ and $b_2$) substantially orthogonal to the face $c_1$ or the face $c_2$ by using two upper sides of the face $c_1$ or $c_2$ starting with apexes ($H_1$ and $H_2$) of the triangular-pyramidal reflective elements as one sides and sharing one ridge line of the triangular-pyramidal reflective elements and using the ridge line as one side, and when assuming the height from the apexes ($H_1$ and $H_2$) of the triangular-pyramidal reflective elements up to the base plane (X–X') including the base edges (x, x, . . . ) of the hexagonal or triangular lateral faces (faces $c_1$ and $c_2$) of the triangular-pyramidal reflective elements as (h), the height from the apexes ($H_1$ and $H_2$) of the triangular-pyramidal reflective elements up to a substantially horizontal plane (Z–Z') including base edges (z and w) of other lateral faces (faces $a_1$ and $b_1$ and faces $a_2$ and $b_2$) of the triangular-pyramidal reflective elements as ($h_0$), the intersection between a vertical line from the apexes ($H_1$ and $H_2$) of the triangular-pyramidal reflective elements to the base plane (X–X') and the base plane (X–X') as P, the intersection between an optical axis passing through the apexes ($H_1$ and $H_2$) and the base plane (X–X') as Q, and moreover, expressing distances from the intersections (P) and (Q) up to planes (Y–Y', Y–Y', . . . ) including the base edges (x, x, . . . ) shared by the triangular-pyramidal reflective elements and vertical to the base plane (X–X') as p and q, and assuming the angle formed between the optical axis and the vertical plane (Y–Y') as (θ), the above h and $h_0$ are not substantially equal and meet the following expression (1)

$$0.5R \leq \frac{h}{h_0} \leq 1.5R \qquad (1)$$

(In the above expression, R has a value defined by the following expression.)

$$R = \frac{\sin(35.2644° - \theta) + 1.2247\sin\theta}{\sin(35.2644° - \theta)}$$

(In the above expression, it is assumed that when the value of the above (p–q) is negative, θ takes a negative (–) value).

2. The triangular-pyramidal cube-corner retroreflective sheeting according to claim 1, characterized in that;

when assuming the height from apexes ($H_1$ and $H_2$) of triangular-pyramidal cube-corner retroreflective elements up to the base plane (X–X') including base edges (x, x, . . . ) of hexagonal or triangular lateral faces (faces $c_1$ and $c_2$) of the triangular-pyramidal reflective elements as (h), the height up to a substantially horizontal plane (Z–Z') including base edges (z and w) of other lateral faces (faces $a_1$ and $b_1$ and faces $a_2$ and $b_2$) of the triangular-pyramidal reflective elements as ($h_0$), the intersection between a vertical line extended from the apexes ($H_1$ and $H_2$) of the triangular-pyramidal reflective elements up to the base plane (X–X') and the base plane (X–X') as P, the intersection between an optical axis passing through the apexes ($H_1$ and $H_2$) and the base plane (X–X') as Q, and moreover distances from the intersections (P) and (Q) up to planes (Y–Y', Y–Y', . . . ) including base edges (x, x, . . . ) shared by the triangular-pyramidal reflective elements and vertical to the base plane (X–X') as p and q, and the angle formed between the optical axis and the vertical plane (Y–Y') as (θ), h and $h_0$ are not substantially equal to each other but they meet the following expression (2)

$$0.6R \leq \frac{h}{h_0} \leq 1.4R \qquad (2)$$

(In the above expression, R is the same as that defined in claim 1).

3. The triangular-pyramidal cube-corner retroreflective sheeting according to claim 1, characterized in that;

when assuming the height from apexes ($H_1$ and $H_2$) of triangular-pyramidal cube-corner retroreflective elements up to the base plane (X–X') including base edges (x, x, . . . ) of hexagonal or triangular lateral faces (faces $c_1$ and $c_2$) of the triangular-pyramidal reflective elements as (h), the height up to a substantially horizontal plane (Z–Z') including base edges (z and w) of other lateral faces (faces $a_1$ and $b_1$ and faces $a_2$ and $b_2$) of the triangular-pyramidal reflective elements as ($h_0$), the intersection between a vertical line extended from the apexes ($H_1$ and $H_2$) of the triangular-pyramidal reflective elements up to the base plane (X–X') and the base plane (X–X') as P, the intersection between an optical axis passing through the apexes ($H_1$ and $H_2$) and the base plane (X–X') as Q, and moreover distances from the intersections (P) and (Q) up to planes (Y–Y', Y–Y', . . . ) including base edges (x, x, . . . ) shared by the triangular-pyramidal reflective elements and vertical to the base plane (X–X') as p and q, and the angle formed between the optical axis and the vertical plane (Y–Y') as (θ), h and $h_0$ are not substantially equal to each other but they meet the following expression (3)

$$0.8R \leq \frac{h}{h_0} \leq 1.2R \qquad (3)$$

(In the above expression, R is the same as that defined in claim 1).

4. The triangular-pyramidal cube-corner retroreflective sheeting according to claim 1, characterized in that;

among h, $h_0$, p, q, and θ defined above, h and $h_0$ are not substantially equal to each other but they meet the following expression (4)

$$0.85R \leq \frac{h}{h_0} \leq 1.15R \quad (4)$$

(In the above expression, R is the same as that defined in claim 1).

5. The triangular-pyramidal cube-corner retroreflective sheeting according to claim 1, characterized in that;
when assuming the height from apexes ($H_1$ and $H_2$) of triangular-pyramidal cube-corner retroreflective elements up to the base plane (X–X') including base edges (x, x, ...) of hexagonal or triangular lateral faces (faces $c_1$ and $c_2$) of the triangular-pyramidal reflective elements as (h), the height up to a substantially horizontal plane (Z–Z') including base edges (z and w) of other lateral faces (faces $a_1$ and $b_1$ and faces $a_2$ and $b_2$) of the triangular-pyramidal reflective elements as ($h_0$), the intersection between a vertical line extended from the apexes ($H_1$ and $H_2$) of the triangular-pyramidal reflective elements up to the base plane (X–X') and the base plane (X–X') as P, the intersection between an optical axis passing through the apexes ($H_1$ and $H_2$) and the base plane (X–X') as Q, and moreover distances from the intersections (P) and (Q) up to planes (Y–Y', Y–Y', ...) including base edges (x, x, ...) shared by the triangular-pyramidal reflective elements and vertical to the base plane (X–X') as p and q, and the angle formed between the optical axis and the vertical plane (Y–Y') as (θ), h and $h_0$ are not substantially equal to each other but they meet the following expression (5)

$$0.3(R-1) \leq \frac{h-h_0}{h_0} \leq 1.5(R-1) \quad (5)$$

(In the above expression, R is the same as that defined in claim 1).

6. The triangular-pyramidal cube-corner retroreflective sheeting according to claim 1, characterized in that;
when assuming the height from apexes ($H_1$ and $H_2$) of triangular-pyramidal cube-corner retroreflective elements up to the base plane (X–X') including base edges (x, x, ...) of hexagonal or triangular lateral faces (faces $c_1$ and $c_2$) of the triangular-pyramidal reflective elements as (h), the height up to a substantially horizontal plane (Z–Z') including base edges (z and w) of other lateral faces (faces $a_1$ and $b_1$ and faces $a_2$ and $b_2$) of the triangular-pyramidal reflective elements as ($h_0$) the intersection between a vertical line extended from the apexes ($H_1$ and $H_2$) of the triangular-pyramidal reflective elements up to the base plane (X–X') and the base plane (X–X') as P, the intersection between an optical axis passing through the apexes ($H_1$ and $H_2$) and the base plane (X–X') as Q, and moreover distances from the intersections (P) and (Q) up to planes (Y–Y', Y–Y', ...) including base edges (x, x, ...) shared by the triangular-pyramidal reflective elements and vertical to the base plane (X–X') as p and q, and the angle formed between the optical axis and the vertical plane (Y–Y') as (θ), h and $h_0$ are not substantially equal to each other but they meet the following expression (6)

$$0.4(R-1) \leq \frac{h-h_0}{h_0} \leq 1.2(R-1) \quad (6)$$

(In the above expression, R is the same as that defined in claim 1).

7. The triangular-pyramidal cube-corner retroreflective sheeting according to any one of claims 1 to 6, characterized in that
the optical axis of triangular-pyramidal cube-corner retroreflective elements tilts in the direction in which the difference (q–p) between the distance (p) from the intersection (P) between a vertical line extended from apexes ($H_1$ and $H_2$) of triangular-pyramidal cube-corner retroreflective elements to a base plane (X–X') and the base plane (X–X') up to the vertical plane (Y–Y') including base edges (x, x, ...) shared by the element pair and the distance (q) from the intersection (Q) between the optical axis of the triangular-pyramidal reflective elements and the base plane (X–X') up to the vertical plane (Y–Y') becomes positive (+) or negative (–) and so as to form an angle of 3° to 15° from a vertical line ($H_1$-P) extended from apexes of the triangular-pyramidal reflective elements to a base plane (X–X').

8. The triangular-pyramidal cube-corner retroreflective sheeting according to any one of claims 1 to 6, characterized in that
the optical axis of triangular-pyramidal cube-corner retroreflective elements tilts in the direction in which the difference (q–p) between the distance (p) from the intersection (P) between a vertical line extended from apexes ($H_1$ and $H_2$) of triangular-pyramidal cube-corner retroreflective elements to a base plane (X–X') and the base plane (X–X') up to the vertical plane (Y–Y') including base edges (x, x, ...) shared by the element pair and the distance (q) from the intersection (Q) between the optical axis of the triangular-pyramidal reflective elements and the base plane (X–X') up to the vertical plane (Y–Y') becomes positive (+) or negative (–) and so as to form an angle of 4° to 12° from a vertical line ($H_1$-P) extended from apexes of the triangular-pyramidal reflective elements to a base plane (X–X').

9. The triangular-pyramidal cube-corner retroreflective sheeting according to any one of claims 1 to 6, characterized in that
the optical axis of triangular-pyramidal cube-corner retroreflective elements tilts in the direction in which the difference (q–p) between the distance (p) from the intersection (P) between a vertical line extended from apexes ($H_1$ and $H_2$) of triangular-pyramidal cube-corner retroreflective elements to a base plane (X–X') and the base plane (X–X') up to the vertical plane (Y–Y') including base edges (x, x, ...) shared by the element pair and the distance (q) from the intersection (Q) between the optical axis of the triangular-pyramidal reflective elements and the base plane (X–X') up to the vertical plane (Y–Y') becomes positive (+) or negative (–) and so as to form an angle of 50° to 10° from a vertical line ($H_1$-P) extended from apexes of the triangular-pyramidal reflective elements to a base plane (X–X').

10. The triangular-pyramidal cube-corner retroreflective sheeting according to claim 9, characterized in that
the distance ($h_0$) from a horizontal plane (Z–Z') including base edges (z and w) of lateral faces (faces $a_1$ and $b_1$ or faces $a_2$ and $b_2$) formed by the fact that substantially-same-shape lateral faces (faces $a_1$ and $b_1$) sharing one ridge line starting with apexes ($H_1$ and $H_2$) of triangular-pyramidal cube-corner retroreflective elements protruded beyond a common base plane (X–X') and using the ridge line as one side intersect with corresponding lateral faces (faces $a_1$ and $b_1$ or faces $a_2$ and $b_2$) of their adjacent other triangular-pyramidal reflective elements up to the apexes ($H_1$ and $H_2$) of the triangular-pyramidal reflective elements ranges between 40 and 250 μm.

11. The triangular-pyramidal cube-corner retroreflective sheeting according to claim 9, characterized in that the distance ($h_0$) from a horizontal plane (Z–Z') including base edges (z and w) of lateral faces (faces $a_1$ and $b_1$ or faces $a_2$ and $b_2$) formed by the fact that substantially-same-shape lateral faces (faces $a_1$ and $b_1$) sharing one ridge line starting with apexes ($H_1$ and $H_2$) of triangular-pyramidal cube-corner retroreflective elements protruded beyond a common base plane (X–X') and using the ridge line as one side intersect with corresponding lateral faces (faces $a_1$ and $b_1$ or faces $a_2$ and $b_2$) of their adjacent other triangular-pyramidal reflective elements up to the apexes ($H_1$ and $H_2$) of the triangular-pyramidal reflective elements ranges between 50 and 200 μm.

12. The triangular-pyramidal cube-corner retroreflective sheeting according to claim 10, characterized in that at least one prism face angle formed by the fact that three lateral faces (faces $a_1$, $b_1$, and $c_1$) or (faces $a_2$, $b_2$, and $c_2$) of a triangular-pyramidal cube-corner retroreflective element intersect with each other ranges between 89.5° and 90.5°.

13. The triangular-pyramidal cube-corner retroreflective sheeting according to claim 10, characterized in that at least one prism face angle formed by the fact that three lateral faces (faces $a_1$, $b_1$, and $c_1$) or (faces $a_2$, $b_2$, and $c_2$) of a triangular-pyramidal cube-corner retroreflective element intersect with each other ranges between 89.7° and 90.3°.

14. The triangular-pyramidal cube-corner retroreflective sheeting according to claim 11, characterized in that at least one prism face angle formed by the fact that three lateral faces (faces $a_1$, $b_1$, and $c_1$) or (faces $a_2$, $b_2$ and $c_2$) of a triangular-pyramidal cube-corner retroreflective element intersect with each other ranges between 89.5° and 90.5°.

15. The triangular-pyramidal cube-corner retroreflective sheeting according to claim 11, characterized in that at least one prism face angle formed by the fact that three lateral faces (faces $a_1$, $b_1$, and $c_1$) or (faces $a_1$, $b_2$ and $c_2$) of a triangular-pyramidal cube-corner retroreflective element intersect with each other ranges between 89.7° and 90.3°.

* * * * *

UNITED STATES PATENT AND TRADEMARK OFFICE
CERTIFICATE OF CORRECTION

PATENT NO. : 6,390,629 B1
DATED : May 21, 2002
INVENTOR(S) : Ikuo Mimura et al.

It is certified that error appears in the above-identified patent and that said Letters Patent is hereby corrected as shown below:

Column 1,
Line 12, "constitute" should read -- constituted --;
Line 25, "faced" should read -- faced towards --;
Line 29, "faced" should read -- facing --; and
Line 43, "sides" should read -- side --.

Column 3,
Line 23, "point" should read -- point is too wide --.

Column 4,
Line 38, "titled" should read -- tilted --; and
Line 45, "faced" should read -- facing --.

Column 5,
Line 33, "each" should read -- with respect to each --; and
Line 45, "faced" should read -- facing --.

Column 6,
Line 13, "faced" should read -- faced toward --;
Line 18, "faced" should read -- facing --; and
Lines 24 and 29, "sides" should read -- side --.

Column 7,
Line 33, "(L-L'" should read -- (L-L') --;
Line 50, "re/reflective" should read -- retroreflective --; and
Line 58, "vies" should read -- views --.

Column 8,
Line 2, "faced" should read -- faced toward --;
Line 19, "FIG. 5" should read -- ¶ FIGS. 5 --;
Lines 26, 49 and 59, "faced" should read -- faced towards --;
Line 36, "faced" should read -- facing --; and "shaking" should read -- sharing --;
Line 41, "sides," should read -- side, --; and
Line 63, "quadran-gular" should read -- quadrangular --.

Column 9,
Line 44, "bas" should read -- base --.

UNITED STATES PATENT AND TRADEMARK OFFICE
CERTIFICATE OF CORRECTION

PATENT NO. : 6,390,629 B1
DATED : May 21, 2002
INVENTOR(S) : Ikuo Mimura et al.

It is certified that error appears in the above-identified patent and that said Letters Patent is hereby corrected as shown below:

Column 10,
Lines 41, 48 and 53, "faced" should read -- faced toward --; and
Lines 61 and 65, "sides" should read -- side --.

Column 11,
Lines 27, 47 and 63, "faced" should read -- faced toward --;
Line 41, "sides" should read -- side --;
Line 53, "through" should read -- though --; and
Line 54, "straight light" should read -- straight line --.

Column 12,
Line 6, "faced" should read -- faced toward --.

Column 13,
Lines 17, 25 and 30, "faced" should read -- faced toward --; and
Lines 38 and 42, "sides" should read -- side --.

Column 15,
Line 49, "(p-q)" should read -- (q-p) --.

Column 16,
Lines 1 and 6, "(p-q)" should read -- (q-p) --;and
Line 53, "tilted in" should read -- being given a --.

Column 17,
Lines 5, 11 and 40, "(p-q)" should read -- (q-p) --; and
Line 20, "a" should be deleted.

Column 18,
Line 2, "becomes" should read -- become --; and
Line 12, "extremely emanates" should read -- is extreme --.

Column 19,
Line 40, "polyhether" should read -- polyether --.

Column 21,
Line 3, "To uniform" should read -- To impart uniformity to --;
Line 19, "after" should read -- after being --; and
Line 54, "each" should read -- to each --.

UNITED STATES PATENT AND TRADEMARK OFFICE
CERTIFICATE OF CORRECTION

PATENT NO. : 6,390,629 B1
DATED : May 21, 2002
INVENTOR(S) : Ikuo Mimura et al.

It is certified that error appears in the above-identified patent and that said Letters Patent is hereby corrected as shown below:

Column 22,
Line 4, "up" should be deleted; and "pressed and" should read -- continuing to apply pressure, and then --;
Line 31, "each" should read -- upon each --;
Line 57, "meets" should read -- possesses the --; and
Line 58, "objects" should read -- desirable properties of the material --.

Column 23,
Line 6, "UP" should read -- U.S. --.

Column 26,
Line 17, "50 to 100" should read -- 5° to 10° --; and
Lines 38 and 40, "faced" should read -- faced toward --.

Column 27,
Line 6, "each" should read -- towards each --;
Line 12, "faced" should read -- facing --; and
Lines 19 and 24, "sides" should read -- side --.

Signed and Sealed this

Seventeenth Day of December, 2002

JAMES E. ROGAN
*Director of the United States Patent and Trademark Office*